US012039904B2

(12) United States Patent
Sin et al.

(10) Patent No.: US 12,039,904 B2
(45) Date of Patent: Jul. 16, 2024

(54) NOISE MEASURING DEVICE AND NOISE MEASURING METHOD USING THE SAME

(71) Applicant: Samsung Display Co., Ltd., Yongin-si (KR)

(72) Inventors: Yujin Sin, Hwaseong-si (KR); Jun-Young Ko, Seoul (KR); Tae-Ho Kim, Seoul (KR); Eunsol Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/844,681

(22) Filed: Jun. 20, 2022

(65) Prior Publication Data

US 2023/0054156 A1 Feb. 23, 2023

(30) Foreign Application Priority Data

Aug. 23, 2021 (KR) ........................ 10-2021-0110756

(51) Int. Cl.
*G09G 3/00* (2006.01)

(52) U.S. Cl.
CPC ......... *G09G 3/006* (2013.01); *G09G 2360/14* (2013.01)

(58) Field of Classification Search
CPC ............... G09G 3/006; G09G 2360/14; G09G 2354/00; G09G 2360/145; G06F 3/0412; G06F 3/0416; G06F 3/0446; H10K 59/40
See application file for complete search history.

(56) References Cited

U.S. PATENT DOCUMENTS

| | | | | |
|---|---|---|---|---|
| 5,850,205 A * | 12/1998 | Blouin | ................. | G09G 3/3406 345/89 |
| 9,357,209 B2 | 5/2016 | Kim et al. | | |

(Continued)

FOREIGN PATENT DOCUMENTS

| | | |
|---|---|---|
| KR | 10-1657215 | 9/2016 |
| KR | 10-2017-0011180 | 2/2017 |

(Continued)

OTHER PUBLICATIONS

Ko et al., "An Effective Quantification Method for Evaluating Horizontal Line Defects by Interference between Flexible OLED and Touch Sensor", SID 2021 Digest, Republic of Korea, pp. 1346-1349.

*Primary Examiner* — Akm Zakaria
(74) *Attorney, Agent, or Firm* — Lewis Roca Rothgerber Christie LLP

(57) ABSTRACT

A noise measurement device for measuring noise of a test image displayed on a display device including a display panel and an input sensor configured to sense an external input, includes a luminance meter, a converter, and a determiner. The luminance meter is configured to: measure a luminance of the test image in a state in which the input sensor is turned on to generate first luminance measurement values; and measure a luminance of the test image in a state in which the input sensor is turned off to generate second luminance measurement values. The converter is configured to apply a contrast sensitivity function to luminance difference values between the first and second luminance measurement values to generate final conversion values. The determiner is configured to compare the final conversion values with a predetermined reference range to determine whether a defect exists in the test image.

17 Claims, 20 Drawing Sheets

(56) References Cited

U.S. PATENT DOCUMENTS

| | | | | |
|---|---|---|---|---|
| 9,535,526 | B2 | 1/2017 | Goo et al. | |
| 9,946,404 | B1 * | 4/2018 | Berget | G06F 3/04182 |
| 10,185,288 | B2 | 1/2019 | Yoon | |
| 10,444,901 | B2 | 10/2019 | Shin | |
| 2006/0262147 | A1 * | 11/2006 | Kimpe | G09G 3/20 345/690 |
| 2014/0240375 | A1 * | 8/2014 | Ha | G09G 3/32 345/82 |
| 2017/0161882 | A1 * | 6/2017 | Mantiuk | H04N 9/68 |
| 2022/0392050 | A1 * | 12/2022 | Hiramatsu | G06T 7/0004 |

FOREIGN PATENT DOCUMENTS

| | | |
|---|---|---|
| KR | 10-2018-0003738 | 1/2018 |
| KR | 10-2119881 | 6/2020 |

* cited by examiner

RT

InF PoF PrF

| Sampling Number | Measurement Pattern | Index | Position (mm) | Profile |
|---|---|---|---|---|
| #1 | 127 | 1.06218 | 40.44 |  |
| #2 | 127 | 1.28151 | 90.46 |  |
| #3 | 127 | 1.27177 | 40.48 |  |
| #4 | 127 | 1.24727 | 87.74 |  |

NOISE MEASURING DEVICE AND NOISE MEASURING METHOD USING THE SAME

CROSS-REFERENCE TO RELATED APPLICATIONS

This application claims priority to and the benefit of Korean Patent Application No. 10-2021-0110756, filed Aug. 23, 2021, which is hereby incorporated by reference for all purposes as if fully set forth herein.

BACKGROUND

Field

One or more embodiments generally relate to a noise measurement device and a noise measurement method using the same, and more particularly, to a noise measurement device capable of measuring noise and a noise measurement method using the same.

Discussion

A multimedia electronic device, such as a television, a mobile phone, a tablet computer, a navigation, a game console, and the like, typically includes a display device for displaying an image. Other than a general input method, such as a button, a keyboard, a mouse, or the like, the display device may include an input sensor capable of providing a touch-based input method that allows a user to easily enter information or commands in an intuitive and convenient manner.

The above information disclosed in this section is only for understanding the background of the inventive concepts, and, therefore, may contain information that does not form prior art.

SUMMARY

One or more embodiments provide a noise measurement device capable of accurately measuring noise.

One or more embodiments provide a noise measurement method using a noise measurement device capable of accurately measuring noise.

Additional aspects will be set forth in the detailed description which follows, and, in part, will be apparent from the disclosure, or may be learned by practice of the inventive concepts.

According to an embodiment, a noise measurement device for measuring noise of a test image displayed on a display device including a display panel and an input sensor disposed on the display panel, the input sensor being configured to sense an external input, includes a luminance meter, a converter, and a determiner. The luminance meter is configured to: measure a luminance of the test image in a state in which the input sensor is turned on to generate first luminance measurement values; and measure a luminance of the test image in a state in which is the input sensor is turned off to generate second luminance measurement values. The converter is configured to apply a contrast sensitivity function to luminance difference values between the first luminance measurement values and the second luminance measurement values to generate final conversion values. The determiner is configured to compare the final conversion values with a predetermined reference range to determine whether a defect exists in the test image.

According to an embodiment, a noise measurement device for measuring noise of a test image displayed on a display device includes a luminance meter, a converter, and a determiner. The luminance meter is configured to measure luminance for each position of the test image displayed on the display device to generate luminance measurement values. The converter is configured to apply a contrast sensitivity function to the luminance measurement values to generate final conversion values. The determiner is configured to compare the final conversion values with a predetermined reference range to determine whether a defect exists in the test image.

According to an embodiment, a noise measurement method for measuring noise of a test image displayed on a display device including a display panel and an input sensor disposed on the display panel, the input sensor being configured to sense an external input, includes: measuring a luminance of the test image displayed on the display device in a state in which the input sensor is turned on to generate first luminance measurement values; measuring a luminance of the test image displayed on the display device in a state in which the input sensor is turned off to generate second luminance measurement values; determining luminance difference values between the first luminance measurement values and the second luminance measurement values; applying a contrast sensitivity function to the luminance difference values to generate final conversion values; and comparing the final conversion values with a predetermined reference range to determine whether a defect exists in the test image.

The foregoing general description and the following detailed description are illustrative and explanatory and are intended to provide further explanation of the claimed subject matter.

BRIEF DESCRIPTION OF THE FIGURES

The accompanying drawings, which are included to provide a further understanding of the inventive concepts, and are incorporated in and constitute a part of this specification, illustrate embodiments of the inventive concepts, and, together with the description, serve to explain principles of the inventive concepts. In the drawings.

DETAILED DESCRIPTION OF SOME EMBODIMENTS

Figure 1:
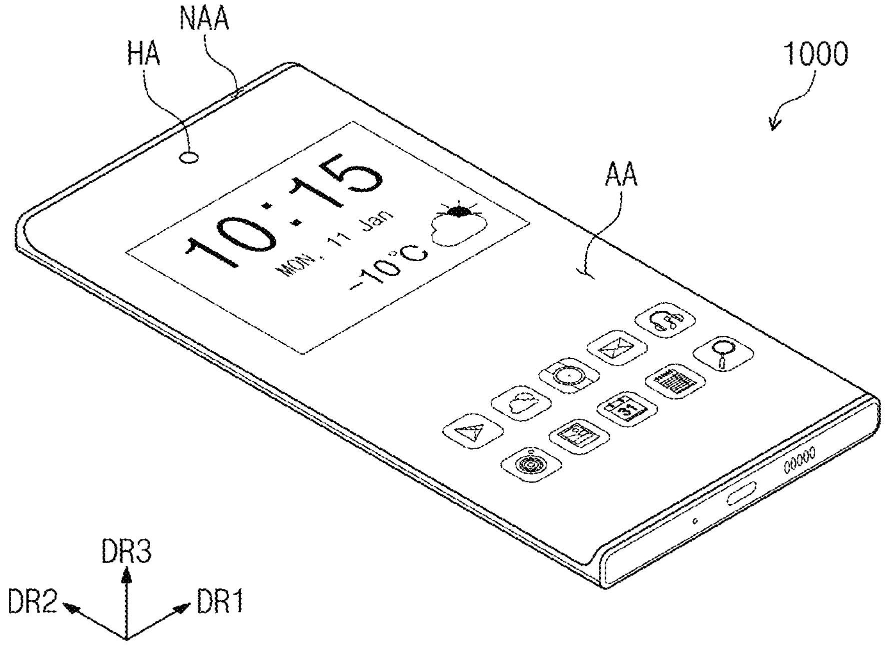
FIG. 1 is a perspective view of a display device according to an embodiment.

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

FIG. 1 is a perspective view of a display device according to an embodiment.

Referring to FIG. 1, a display device 1000 may be a device that is activated according to an electrical signal. For example, the display device 1000 may be a smartphone, a foldable smartphone, a laptop, a television, a tablet, a navigation for vehicle, a game console, or a wearable device, but embodiments are not limited thereto. It is illustratively shown that the display device 1000 is a smartphone in FIG. 1.

An active area AA and a peripheral area NAA may be defined in the display device 1000. The display device 1000 may display an image on (or via) the active area AA. The active area AA may include a surface defined by a first direction DR1 and a second direction DR2. The peripheral area NAA is outside the active area AA, e.g., the peripheral area NAA may surround the active area AA.

The display device 1000 may include a sensing area HA. The sensing area HA may be a portion of the active area AA. The sensing area HA may have higher transmissivity than another (or the other) portion of the active area AA. An optical signal, for example, a visible ray or an infrared ray, may pass through the sensing area HA. The display device 1000 may capture an external image by means of the visible ray passing through the sensing area HA and may determine proximity of an external object by means of the infrared ray, but embodiments are not limited thereto. It is illustratively shown that there is one sensing area HA in FIG. 1, but embodiments are not limited thereto. The sensing area HA may be one of a plurality of sensing areas.

A thickness direction of the display device 1000 may be parallel to a third direction DR3 intersecting the first direction DR1 and the second direction DR2. Thus, front surfaces (or upper surfaces) and back surfaces (or lower surfaces) of members constituting the display device 1000 may be defined (or distinguished) with respect to the third direction DR3.

Figure 2:
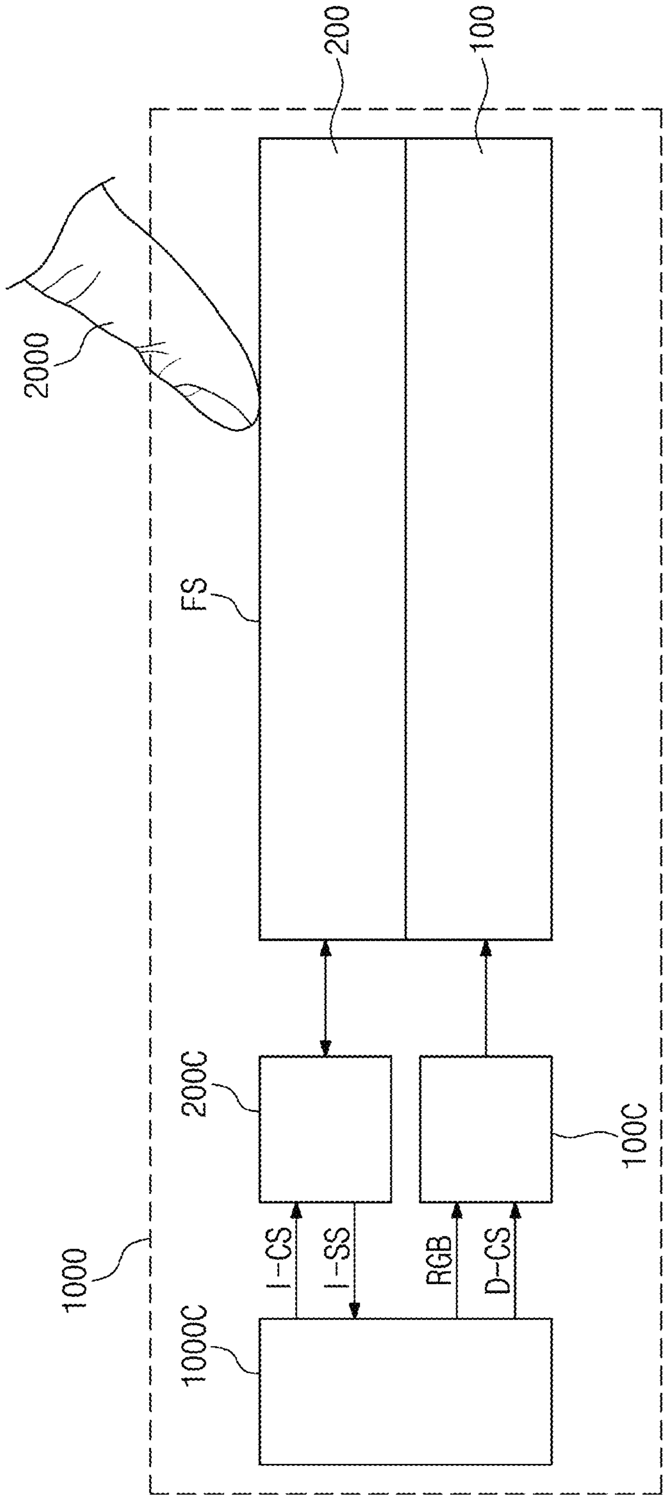
FIG. 2 is a drawing for describing an operation of a display device according to an embodiment.

FIG. 2 is a drawing for describing an operation of a display device according to an embodiment.

Referring to FIG. 2, a display device 1000 may include a display panel 100, an input sensor 200, a panel driver 100C, a sensor controller 200C, and a main controller 1000C.

The display panel 100 may be a component that generates (or substantially generates) an image. The image generated by means of the display panel 100 may be displayed on a display surface FS of the display device 1000. The display panel 100 may be a light emitting type display panel. For example, the display panel 100 may be an organic light emitting display panel, an inorganic light emitting display panel, a quantum dot display panel, a micro-light emitting diode (LED) display panel, or a nano-LED display panel, or the like.

The input sensor 200 may be disposed on the display panel 100. The input sensor 200 may sense an external input 2000 applied from the outside. The external input 2000 may include all inputs through an input means capable of providing a change in capacitance. For example, the input sensor 200 may sense an input by an active-type input means (e.g., an active pen, a stylus pen, an electronic pen, or the like) for transmitting and receiving a signal, as well as an input by a passive-type input means, such as a body (e.g., a finger) of a user. Furthermore, the input sensor 200 may sense an approach or hovering action of an object close to the display surface FS of the display device 1000.

The main controller 1000C may control the overall operation of the display device 1000. For example, the main controller 1000C may control operations of the panel driver 100C and the sensor controller 200C. The main controller 1000C may include at least one microprocessor, and the main controller 1000C may be referred to as a host. The main controller 1000C may further include a graphics controller.

The panel driver 100C may drive the display panel 100. The panel driver 100C may receive image data RGB and a display control signal D-CS from the main controller 1000C. The display control signal D-CS may include various control signals. For example, the display control signal D-CS may include a vertical synchronization signal, a horizontal synchronization signal, a main clock, a data enable signal, and the like. The panel driver 100C may generate a scan control signal and a data control signal for controlling the driving of the display panel 100 based on the display control signal D-CS.

The sensor controller 200C may control the driving of the input sensor 200. The sensor controller 200C may receive a sensing control signal I-CS from the main controller 1000C. The main controller 1000C may provide the sensor controller 200C with some of the signals included in the display control signal D-CS, for example, the vertical synchronization signal and/or the horizontal synchronization signal, other than the sensing control signal I-CS. Additionally or alternatively, the panel driver 100C may provide the sensor controller 200C with some of the signals included in the display control signal D-CS received from the main controller 1000C, for example, the vertical synchronization signal and/or the horizontal synchronization signal.

The sensor controller 200C may determine (e.g., calculate) coordinate information of a user input based on a signal received from the input sensor 200 and may provide the main controller 1000C with a coordinate signal I-SS including the coordinate information. The main controller 1000C may execute an operation corresponding to the user input based on the coordinate signal I-SS. For example, the main controller 1000C may operate the panel driver 100C such that a new application image is displayed on the display panel 100.

Figure 3A:
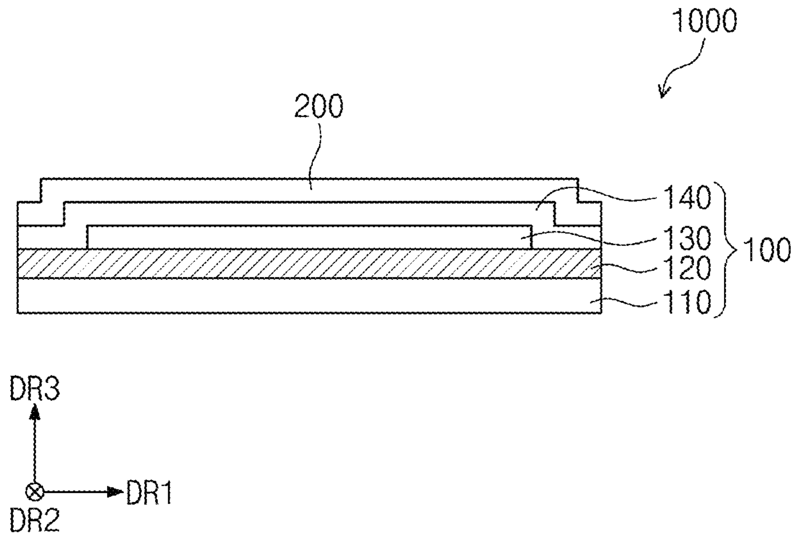
FIG. 3A is a cross-sectional view of a display device according to an embodiment.

FIG. 3A is a cross-sectional view of a display device according to an embodiment.

Referring to FIG. 3A, a display device 1000 may include a display panel 100 and an input sensor 200. The display panel 100 may include a base layer 110, a circuit layer 120, a light emitting element layer 130, and an encapsulation layer 140.

The base layer 110 may be a member that provides a base surface on which the circuit layer 120 is disposed. The base layer 110 may include a glass material, a metal material, a polymer material, and/or the like. However, embodiments are not limited thereto, and the base layer 110 may include an inorganic layer, an organic layer, or a composite material layer.

The base layer 110 may have a single layer or multi-layered structure. For example, the base layer 110 may include a first synthetic resin layer and a second synthetic resin layer disposed on the first synthetic resin layer. Each of the first and second synthetic resin layers may include polyimide-based resin. Furthermore, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin.

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 by a scheme, such as coating or deposition, and the insulating layer, the semiconductor layer, and the conductive layer may then be selectively patterned through a plurality of photolithography processes. Thereafter, the semiconductor pattern, the conductive pattern, and the signal line included in the circuit layer 120 may be formed.

The light emitting element layer 130 may be disposed on the circuit layer 120. The light emitting element layer 130 may include a plurality of light emitting elements. For example, the light emitting element layer 130 may include an organic light emitting material, an inorganic light emitting material, a quantum dot, a quantum rod, a micro-LED, or a nano-LED, but embodiments are not limited thereto.

The encapsulation layer 140 may be disposed on the light emitting element layer 130. The encapsulation layer 140 may protect the light emitting element layer 130 from foreign substances, such as moisture, oxygen, dust particles, etc.

The input sensor 200 may be disposed on the display panel 100. The input sensor 200 may sense the external input 2000 (refer to FIG. 2) applied from the outside. The external input 2000 may be a user input. The user input may include various types of external inputs, such as a part of the user's body, light, heat, a pen, pressure, acoustics, and/or the like.

The input sensor 200 may be formed on the display panel 100 through subsequent processes. In this case, the input sensor 200 may be expressed as being directly disposed on the display panel 100. The expression "directly disposed" may mean that a third component is not disposed between the input sensor 200 and the display panel 100. For instance, a separate adhesive layer may not be disposed between the input sensor 200 and the display panel 100. Optionally, the input sensor 200 may be coupled to the display panel 100 through an adhesive layer. The adhesive layer may include a typical adhesive or a typical sticking agent.

The display device 1000 may further include an anti-reflection layer and an optical layer, which are disposed on the input sensor 200. The anti-reflection layer may reduce a reflectivity of an external light incident from the outside of the display device 1000. The optical layer may improve the front luminance of the display device 1000 by controlling a direction of light incident from the display panel 100.

Figure 3B:
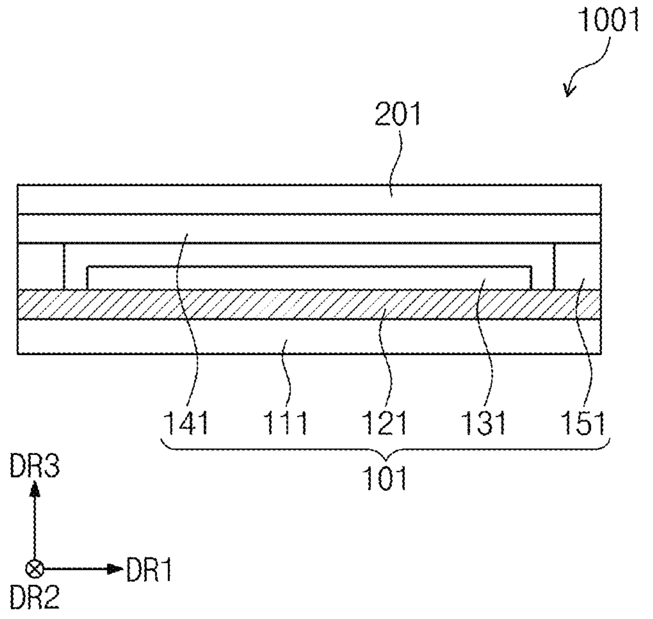
FIG. 3B is a cross-sectional view of a display device according to an embodiment.

FIG. 3B is a cross-sectional view of a display device according to an embodiment.

Referring to FIG. 3B, a display device 1001 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, a polymer substrate, and/or the like, but are limited thereto.

The coupling member 151 may be disposed between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photo-curable resin or a photo-plastic resin. However, a material making up the coupling member 151 is not limited to the above examples.

The input sensor 201 may be directly disposed on the encapsulation substrate 141. The expression "directly disposed" may mean that a third component is not disposed between the input sensor 201 and the encapsulation substrate 141. In other words, a separate adhesive layer may fail to be disposed between the input sensor 201 and the display panel 101, but embodiments are not limited thereto. For instance, in some embodiments, an adhesive layer may be further disposed between the input sensor 201 and the encapsulation substrate 141.

Figure 4:
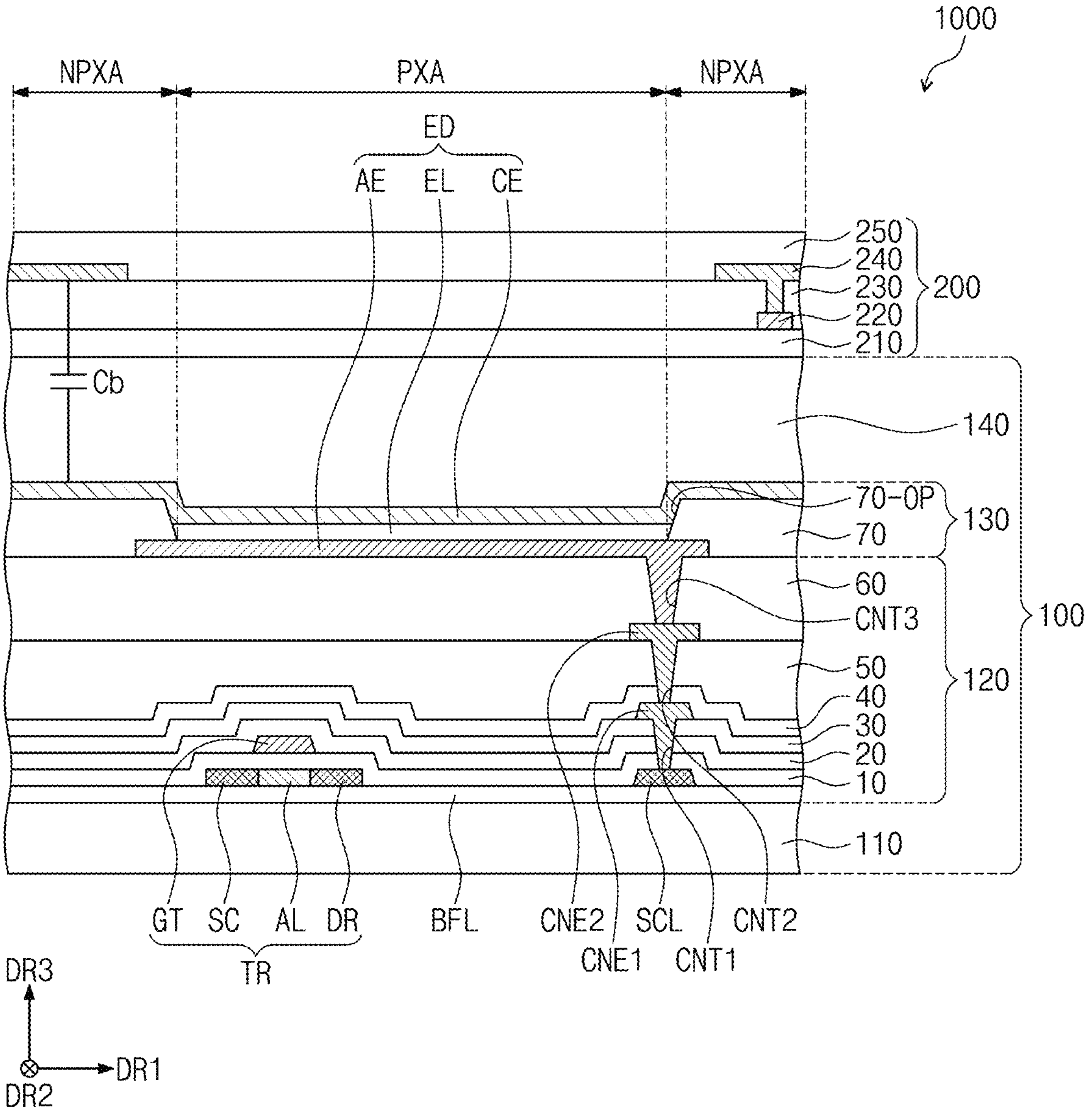
FIG. 4 is a cross-sectional view of a display panel and an input sensor according to an embodiment.

FIG. 4 is a cross-sectional view of a display panel and an input sensor according to an embodiment.

Referring to FIG. 4, a display panel 100 may include a base layer 110. At least one inorganic layer may be disposed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may make up a barrier layer and/or a buffer layer. In an embodiment, the display panel 100 is illustrated as including a buffer layer BFL.

The buffer layer BFL may improve a bonding force between the base layer 110 and a semiconductor pattern. The buffer layer BFL may include at least one of silicon oxide, silicon nitride, and silicon oxynitride. For example, the buffer layer BFL may include a structure in which a silicon oxide layer and a silicon nitride layer are alternately laminated.

The semiconductor pattern may be disposed on the buffer layer BFL. The semiconductor pattern may include polysilicon. However, embodiments are not limited thereto, and the semiconductor pattern may include amorphous silicon, low-temperature polycrystalline silicon, or oxide semiconductor.

FIG. 4 only illustrates a portion of the semiconductor pattern, and the semiconductor pattern may be further disposed in another area. Semiconductor patterns may be arranged across pixels in a specific rule or design pattern. The semiconductor pattern may have a different electrical property depending on whether it is doped. The semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than that of the first area.

The first area may be greater in conductivity than the second area and may substantially serve as an electrode or a signal line. The second area may substantially correspond to an active region (or channel) of a transistor. In other words, a portion of the semiconductor pattern may be an active portion of a transistor, another portion thereof may be a source or a drain of the transistor, and another portion thereof may be a connection electrode or a connection signal line.

Each of pixels may have an equivalent circuit including, for example, seven transistors, one capacitor, and a light emitting element ED, and the equivalent circuit diagram of the pixel may be modified in various forms. It is noted, however, that any other suitable equivalent circuit for the pixels may be utilized. One transistor TR and one light emitting element ED included in a pixel are illustrated in FIG. 4.

A source portion SC, an active portion AL, and a drain portion DR of the transistor TR may be formed from the semiconductor pattern. The source portion SC and the drain portion DR may be extended in directions facing each other from the active portion AL on a cross-section. A portion of a connection signal line SCL formed from the semiconductor pattern is illustrated in FIG. 4. Although not separately illustrated, the connection signal line SCL may be connected to the drain DR of the transistor TR on the plane.

A first insulating layer 10 may be disposed on the buffer layer BFL. The first insulating layer 10 may be overlapped with a plurality of pixels in common and may cover the semiconductor pattern. The first insulating layer 10 may be an inorganic layer and/or an organic layer, and may have a single-layer or multilayer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. As well as the first insulating layer 10, each of insulating layers of the circuit layer 120 to be described later may be an inorganic layer and/or an organic layer, and may have a single-layer or multilayer structure. The inorganic layer may include at least one of the materials described above, but is not limited thereto.

The gate GT of the transistor TR may be disposed on the first insulating layer 10. The gate GT may be a portion of a metal pattern. The gate GT may be overlapped with the active portion AL. The gate GT may function as a mask in a process of doping the semiconductor pattern.

A second insulating layer 20 may be disposed on the first insulating layer 10 and may cover the gate GT. The second insulating layer 20 may be overlapped with pixels in common. The second insulating layer 20 may be an inorganic layer and/or an organic layer, and may have a single-layer or multilayer structure. The second insulating layer 20 may include at least one of silicon oxide, silicon nitride, and silicon oxynitride. In an embodiment, the second insulating layer 20 may have a multilayer structure including a silicon oxide layer and a silicon nitride layer.

A third insulating layer 30 may be disposed on the second insulating layer 20. The third insulating layer 30 may have a single-layer or multilayer structure. For example, the third insulating layer 30 may have a multilayer structure including a silicon oxide layer and a silicon nitride layer.

A first connection electrode CNE1 may be disposed on the third insulating layer 30. The first connection electrode CNE1 may be connected to the connection signal line SCL through a first contact hole CNT1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a second contact hole CNT2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element ED. For example, the light emitting element layer 130 may include an organic light emitting material, an inorganic light emitting material, a quantum dot, a quantum rod, a micro-LED, a nano-LED, and/or the like. Hereinafter, the description will be given of an example in which the light emitting element ED is the organic light emitting element, but embodiments are not thereto.

The light emitting element ED may include a first electrode AE, a light emitting layer EL, and a second electrode CE.

The first electrode AE may be disposed on the sixth insulating layer 60. The first electrode AE may be connected to the second connection electrode CNE2 through a third contact hole CNT3 penetrating the sixth insulating layer 60.

A pixel definition layer 70 may be disposed on the sixth insulating layer 60 and may cover a part of the first electrode AE. An opening 70-OP may be defined in the pixel definition layer 70. The opening 70-OP of the pixel definition layer 70 may expose at least a portion of the first electrode AE.

An active area AA (refer to FIG. 1) may include a light emitting area PXA and a non-light emitting area NPXA adjacent to the light emitting area PXA. The non-light emitting area NPXA may surround the light emitting area PXA. In an embodiment, the light emitting area PXA is defined to correspond to a partial area of the first electrode AE that is exposed by the opening 70-OP.

The light emitting layer EL may be disposed on the first electrode AE. The light emitting layer EL may be disposed in an area corresponding to the opening 70-OP. For instance, the light emitting layer EL may be separately formed in each pixel. When a plurality of light emitting layers EL are separately formed in the plurality of pixels, each of the plurality of light emitting layers EL may emit light of at least one of a determined color, such as a blue color, a red color, and a green color, but embodiments are not limited thereto. The plurality of light emitting layers EL may be connected to each other to be provided in common in the plurality of pixels. In this case, the light emitting layers EL provided in common in the plurality of pixels may provide a same color, such as a blue light or white light.

The second electrode CE may be disposed on the light emitting layer EL. A plurality of second electrodes CE may be separately formed in the plurality of pixels, respectively. Alternatively, the plurality of second electrodes CE may be connected to each other to be arranged in common in the plurality of pixels.

In some embodiments, a hole control layer may be disposed between the first electrode AE and the light emitting layer EL. The hole control layer may be disposed in common on the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be formed in common in a plurality of pixels using an open mask.

The encapsulation layer 140 may be disposed on the light emitting element layer 130. The encapsulation layer 140 may include an inorganic layer, an organic layer, and an inorganic layer sequentially laminated, but layers making up the encapsulation layer 140 are not limited thereto.

The inorganic layers may protect the light emitting element layer 130 from moisture and oxygen, and the organic layer may protect the light emitting element layer 130 from a foreign material, such as dust particles. The inorganic layers may include a silicon nitride layer, a silicon oxynitride layer, a silicon oxide layer, a titanium oxide layer, an aluminum oxide layer, and/or the like. The organic layer may include, but is not limited to, an acrylic-based organic layer.

The input sensor 200 may include a base insulating layer 210, a first conductive layer 220, a sensing insulating layer 230, a second conductive layer 240, and a cover insulating layer 250.

The base insulating layer 210 may be an inorganic layer including at least one of silicon nitride, silicon oxynitride, and silicon oxide. Alternatively, the base insulating layer 210 may be an organic layer including an epoxy resin, an acrylic resin, and/or an imide-based resin. The base insulating layer 210 may have a single-layer structure or may be a multilayer structure laminated along the third direction DR3.

Each of the first conductive layer 220 and the second conductive layer 240 may have a single-layer structure or may have a multilayer structure laminated along the third direction DR3.

A conductive layer of a single-layer structure may include a metal layer or a transparent conductive layer. The metal layer may include at least one of molybdenum, silver, titanium, copper, and aluminum, or any alloy thereof. The transparent conductive layer may include transparent conductive oxide, such as indium tin oxide (ITO), indium zinc oxide (IZO), zinc oxide (ZnO), or indium zinc tin oxide (IZTO). In addition, the transparent conductive layer may include conductive polymer such as poly(3,4-ethylenedioxythiophene) (PEDOT), metal nanowire, graphene, or the like.

A conductive layer of a multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer 230 and the cover insulating layer 250 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 230 and the cover insulating layer 250 may include an organic layer. The organic layer may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and perylene-based resin.

A parasitic capacitance Cb may be generated between the input sensor 200 and the second electrode CE. The parasitic capacitance Cb may also be referred to as a base capacitance. As the input sensor 200 and the second electrode CE are closer in distance to each other, the parasitic capacitance Cb may increase in value. The larger the parasitic capacitance Cb, the more signal interference between the input sensor 200 and the display panel 100 may increase.

Figure 5:
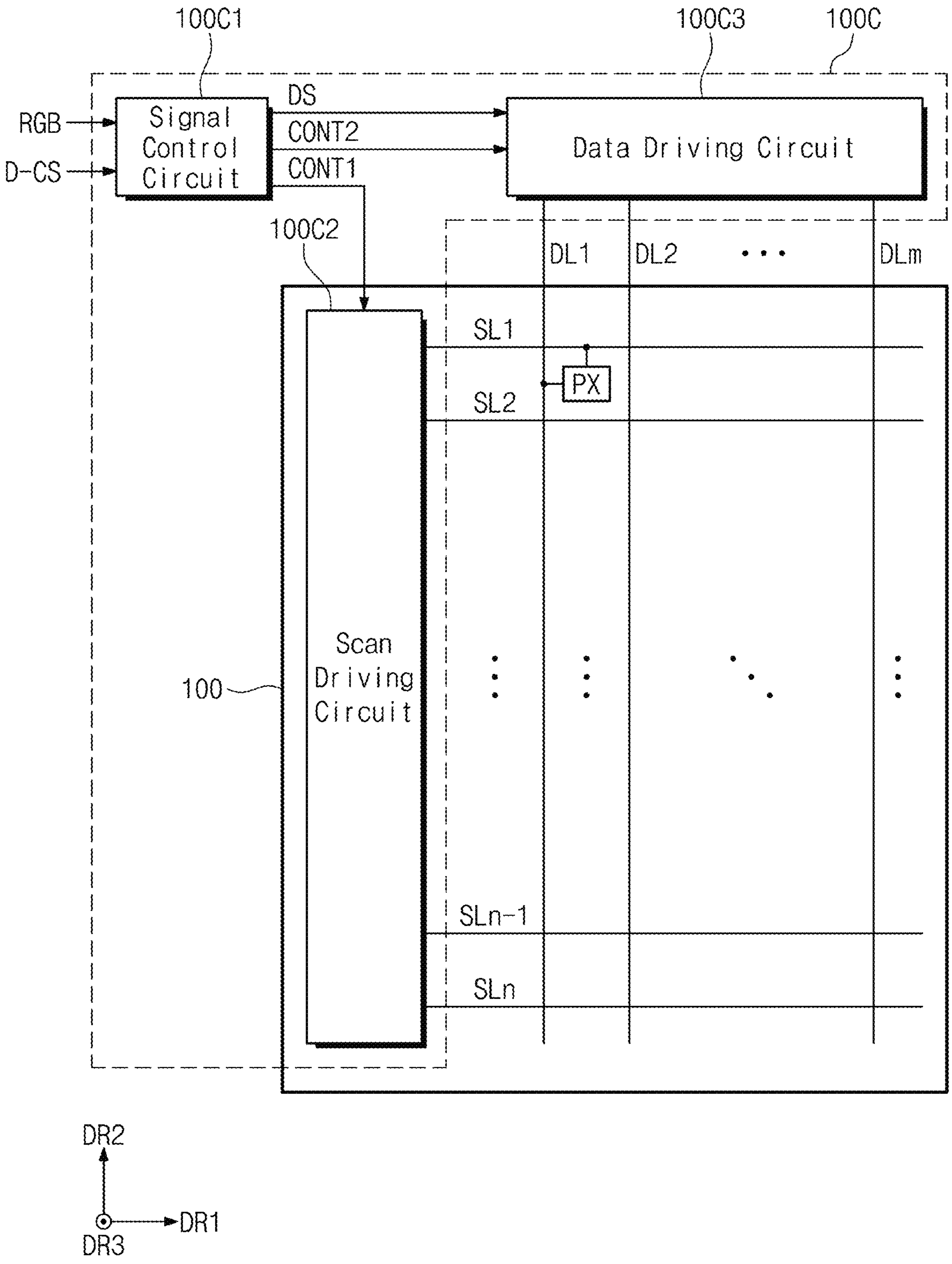
FIG. 5 is a block diagram of a display panel and a panel driver according to an embodiment.

FIG. 5 is a block diagram of a display panel and a panel driver according to an embodiment.

Referring to FIG. 5, a display panel 100 may include a plurality of scan lines SL1-SLn, a plurality of data lines DL1-DLm, and a plurality of pixels PX. Each of the plurality of pixels PX may be connected to a corresponding data line of the plurality of data lines DL1-DLm and may be connected to a corresponding scan line of the plurality of scan lines SL1-SLn. In an embodiment, the display panel 100 may further include light emitting control lines, and the panel driver 100C may further include a light emitting driving circuit, which provides control signals to the light emitting control lines. A configuration of the display panel 100 is, however, not particularly limited.

Each of the plurality of scan lines SL1-SLn may be extended in the first direction DR1, and the plurality of scan lines SL1-SLn may be arranged spaced from each other in the second direction DR2. Each of the plurality of data lines DL1-DLm may be extended in the second direction DR2, and the plurality of data lines DL1-DLm may be arranged spaced from each other in the first direction DR1.

The panel driver 100C may include a signal control circuit 100C1, a scan driving circuit 100C2, and a data driving circuit 100C3.

The signal control circuit 100C1 may receive image data RGB and a display control signal D-CS from a main controller 1000C (refer to FIG. 2). The display control signal D-CS may include various control signals. For example, the display control signal D-CS may include a vertical synchronization signal, a horizontal synchronization signal, a main clock signal, a data enable signal, and the like.

The signal control circuit 100C1 may generate a scan control signal CONT1 based on the display control signal D-CS and may output the scan control signal CONT1 to the scan driving circuit 100C2. The scan control signal CONT1 may include a vertical start signal, a clock signal, and the like. The signal control circuit 100C1 may generate a data control signal CONT2 based on the display control signal D-CS and may output the data control signal CONT2 to the data driving circuit 100C3. The data control signal CONT2 may include a horizontal start signal, an output enable signal, and the like.

Furthermore, the signal control circuit 100C1 may output a data signal DS, which is obtained by processing the image data RGB to suit an operating condition of the display panel 100, to the data driving circuit 100C3. The scan control signal CONT1 and the data control signal CONT2 may be signals for operations of the scan driving circuit 100C2 and the data driving circuit 100C3, which are not specifically limited.

The scan driving circuit 100C2 may sequentially apply a scan signal to the plurality of scan lines SL1-SLn in response to the scan control signal CONT1. In an embodiment, the scan driving circuit 100C2 may be formed in the same process as a circuit layer 120 (refer to FIG. 4) in the display panel 100, but is not limited thereto. Optionally, the scan driving circuit 100C2 may be implemented as an integrated circuit (IC), which may be mounted (e.g., directly mounted) on a certain area of the display panel 100 or may be mounted on a separate printed circuit board in a chip on film (COF) manner to be electrically connected with the display panel 100.

The data driving circuit 100C3 may output gray scale voltages to the plurality of data lines DL1-DLm in response to the data control signal CONT2 and the data signal DS from the signal control circuit 100C1. The data driving circuit 100C3 may be implemented as an IC, and may be directly mounted on a certain area of the display panel 100 or may be mounted on a separate printed circuit board in the COF manner to be electrically connected with the display panel 100, but is not limited thereto. Optionally, the data driving circuit 100C3 may be formed in the same process as the circuit layer 120 (refer to FIG. 4) in the display panel 100.

Figure 6:
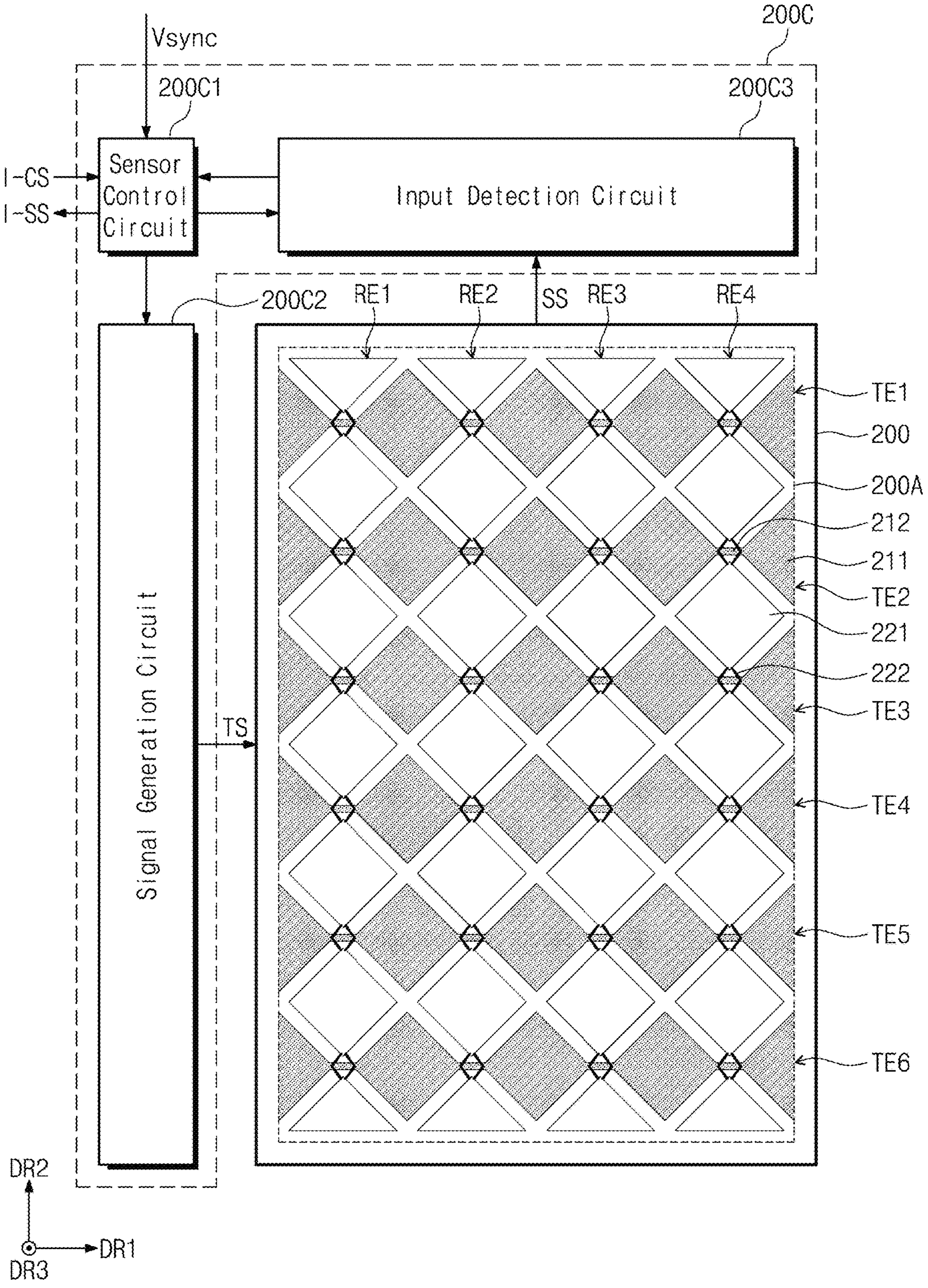
FIG. 6 is a block diagram of an input sensor and a sensor controller according to an embodiment.

FIG. 6 is a block diagram of an input sensor and a sensor controller according to an embodiment.

Referring to FIG. 6, an input sensor 200 may include a plurality of transmit electrodes TE1-TE6 and a plurality of receive electrodes RE1-RE4. The plurality of transmit electrodes TE1-TE6 may be extended in a first direction DR1 and may be arranged in a second direction DR2. As an example, the transmit electrodes TE1-TE6 may be extended along scan lines SL1-SLn (refer to FIG. 5). The plurality of receive electrodes RE1-RE4 may be extended in the second direction DR2 and may be arranged in the first direction DR1. The plurality of transmit electrodes TE1-TE6 may intersect the plurality of receive electrodes RE1-RE4. A capacitance may be formed between the plurality of transmit electrodes TE1-TE6 and the plurality of receive electrodes RE1-RE4. For convenience of description, six transmit electrodes TE1-TE6 and four receive electrodes RE1-RE4 are illustrated in FIG. 6, but the number of the transmit electrodes TE1-TE6 and the number of the receive electrodes RE1-RE4 are not limited thereto.

The input sensor 200 may further include a plurality of first signal lines connected to the plurality of transmit electrodes TE1-TE6 and a plurality of second signal lines connected to the plurality of receive electrodes RE1-RE4.

Each of the plurality of transmit electrodes TE1-TE6 may include a first sensing portion 211 and a connection portion 212. The first sensing portion 211 and the connection portion 212 may have an integrated shape and may be arranged on the same layer. For example, the first sensing portion 211 and the connection portion 212 may be included in a second conductive layer 240 (refer to FIG. 4). Alternatively, the first sensing portion 211 and the connection portion 212 may be included in a first conductive layer 220 (refer to FIG. 4).

Each of the plurality of receive electrodes RE1-RE4 may include a second sensing portion 221 and a bridge portion 222. The two second sensing portions 221 adjacent to each other may be electrically connected to each other by the bridge portion 222, but embodiments are not limited thereto. The second sensing portion 221 and the bridge portion 222 may be disposed on different layers. For example, the second sensing portion 221 may be included in the second conductive layer 240, and the bridge portion 222 may be included in the first conductive layer 220. Alternatively, the second sensing portion 221 may be included in the first conductive layer 220, and the bridge portion 222 may be included in the second conductive layer 240.

The bridge portion 222 may intersect the connection portion 212 and may be insulated from the connection portion 212. When the first and second sensing portions 211 and 221 and the connection portion 212 are included in the second conductive layer 240, the bridge portion 222 may be included in the first conductive layer 220. Alternatively, when the first and second sensing portions 211 and 221 and the connection portion 212 are included in the first conductive layer 220, the bridge portion 222 may be included in the second conductive layer 240.

Each of the plurality of transmit electrodes TE1-TE6 may have a mesh shape, and each of the plurality of receive electrodes RE1-RE4 may have a mesh shape.

The sensor controller 200C may receive a sensing control signal I-CS from a main controller 1000C (refer to FIG. 2) and may provide a coordinate signal I-SS to the main controller 1000C. The sensor controller 200C may be implemented as an integrated circuit (IC), which may be directly mounted on a certain area of the input sensor 200 or the display panel 100, or may be mounted on a separate printed circuit board in the chip on film (COF) manner to be electrically connected with the input sensor 200.

The sensor controller 200C may include a sensor control circuit 200C1, a signal generation circuit 200C2, and an input detection circuit 200C3. The sensor control circuit 200C1 may receive a synchronization signal from the main controller 1000C or the signal control circuit 100C1. The sensor control circuit 200C1 may control operations of the signal generation circuit 200C2 and the input detection circuit 200C3 based on the sensing control signal I-CS and the synchronization signal. As an example, the synchronization signal may include a vertical synchronization signal Vsync.

The signal generation circuit 200C2 may output transmit signals TS to the transmit electrodes TE1-TE6 of the input sensor 200. The input detection circuit 200C3 may receive sensing signals SS from the receive electrodes RE1-RE4 of the input sensor 200. The input detection circuit 200C3 may convert an analog signal into a digital signal. For example, the input detection circuit 200C3 may amplify and filter the received sensing signals SS of an analog form and may convert the filtered signals into digital signals.

The sensor control circuit 200C1 may generate the coordinate signal I-SS based on the digital signal received from the input detection circuit 200C3. For instance, when an external input 2000 (refer to FIG. 2) (e.g., a touch input) by a finger of a user is detected, the sensor control circuit 200C1 may generate the coordinate signal I-SS including information about coordinates at which the touch input is provided using the digital signal.

Figure 7:
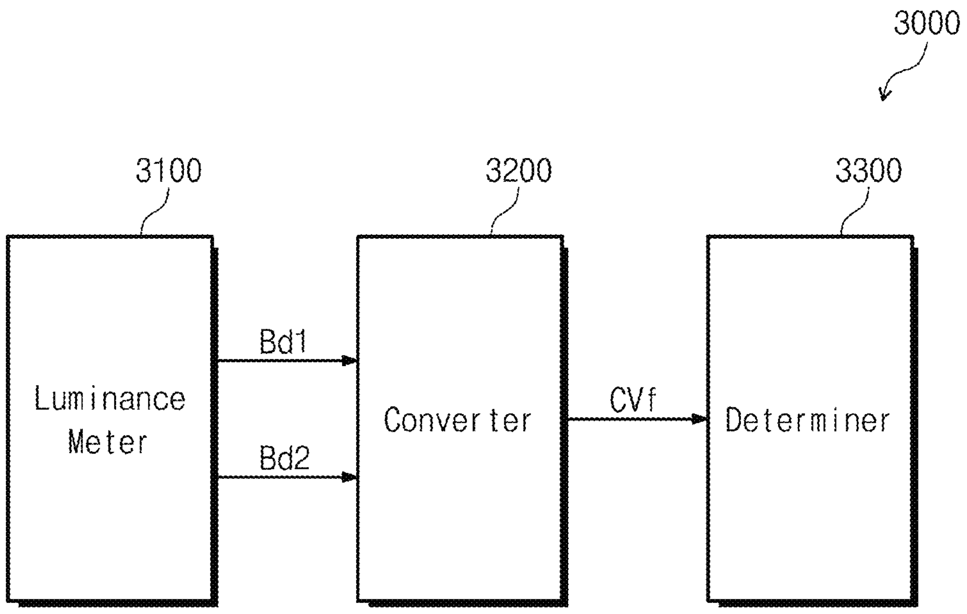
FIG. 7 is a block diagram of a noise measurement device according to an embodiment.
Figure 8A:
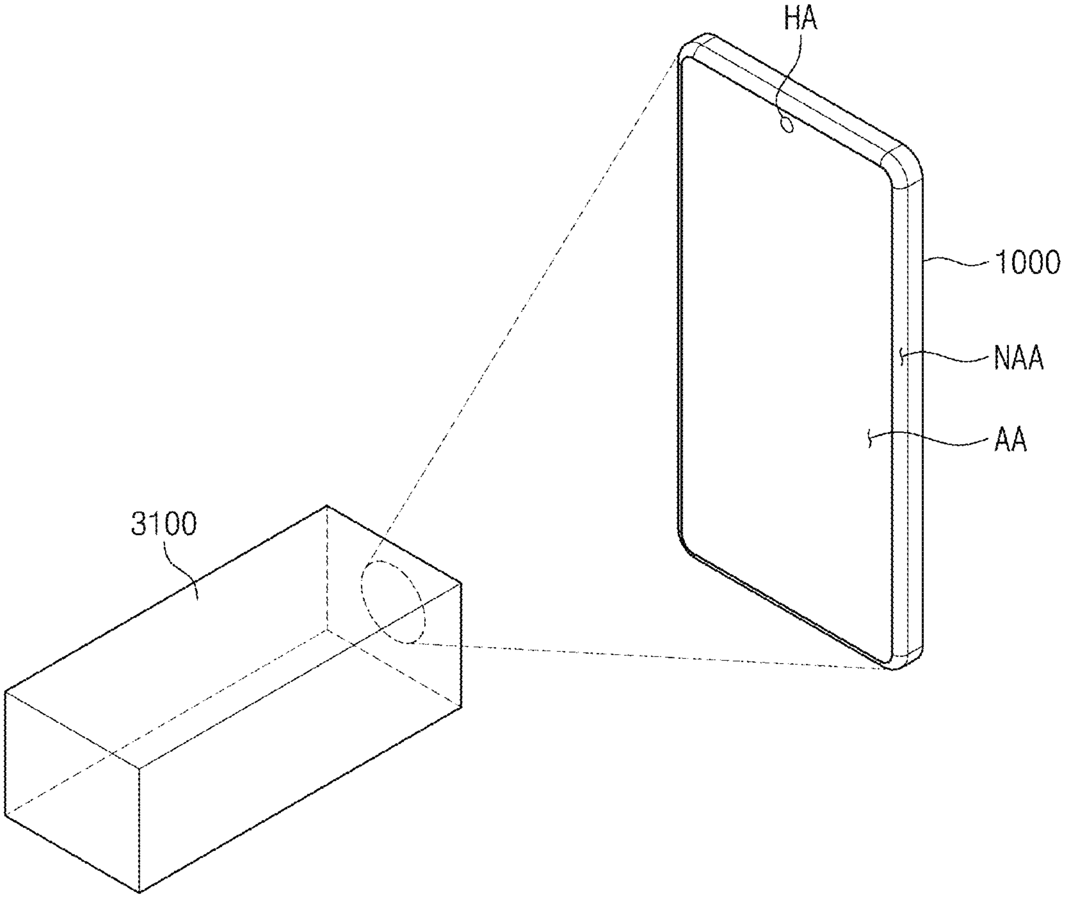
FIG. 8A is a conceptual diagram illustrating a process of measuring a luminance of a display device via a luminance meter shown in FIG. 7 according to an embodiment.
Figure 8B:
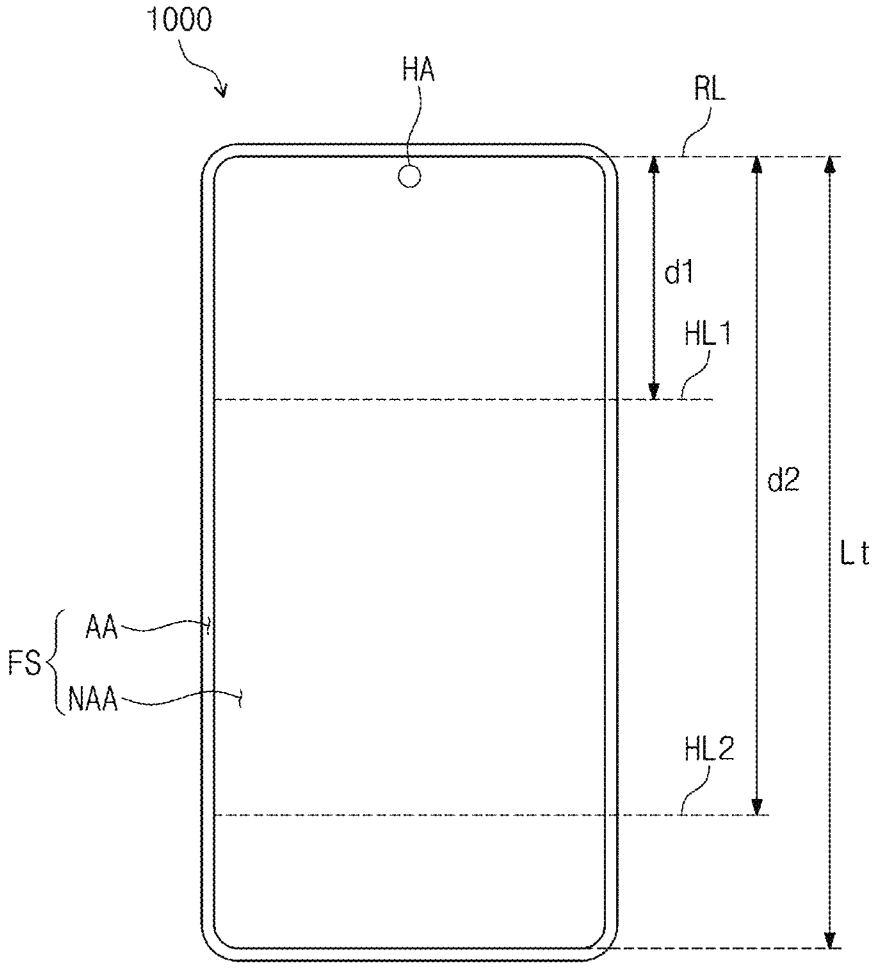
FIG. 8B is a plan view illustrating a display device shown in FIG. 8A according to an embodiment.

FIG. 7 is a block diagram of a noise measurement device according to an embodiment. FIG. 8A is a conceptual diagram illustrating a process of measuring a luminance of a display device in a luminance meter shown in FIG. 7 according to an embodiment. FIG. 8B is a plan view illustrating a display device shown in FIG. 8A according to an embodiment.

Referring to FIG. 7, a noise measurement device 3000 according to an embodiment may be a device for measuring noise of a test image displayed on a display device 1000. For example, the noise measurement device 3000 may measure noise generated by an input sensor 200 in the test image displayed on the display device 1000 including a display panel 100 and the input sensor 200. The noise measurement device 3000 may quantify noise generated by the input sensor 200 and may determine whether a noise defect occurs in the display device 1000 based on the quantified result.

According to an embodiment, the noise measurement device 3000 may include a luminance meter 3100, a converter 3200, and a determiner 3300. The luminance meter 3100 may measure luminance at predetermined positions of the test image displayed on the display device 1000 in a state (hereinafter, referred to as a "TSP-ON state") where the input sensor 200 is turned on to generate first luminance measurement values Bd1 according to the positions. Furthermore, the luminance meter 3100 may measure luminance at the positions of the test image displayed on the display device 1000 in a state (hereinafter, referred to as a "TSP-OFF state") where the input sensor 200 is turned off to generate second luminance measurement values Bd2 according to the positions.

As shown in FIGS. 8A and 8B, the luminance meter 3100 may be disposed to face a display surface FS of the display device 1000. The test image may be displayed on the display surface FS. The display surface FS may be parallel to a first direction DR1 and a second direction DR2 intersecting the first direction DR1. The display surface FS may include an active area AA on which the test image is substantially displayed and a peripheral area NAA surrounding the active area AA.

The luminance meter 3100 may measure luminance values at positions set to correspond to virtual horizontal lines, which are substantially and subsequently arranged in the active area AA. The positions may be set to a distance in any one of the first and second directions DR1 and DR2 from a predetermined reference line RL on the display surface FS of the plurality of horizontal lines. As an example, the reference line RL may be located adjacent to any one of two sides parallel to the first direction DR1 of the active area AA. In this case, the positions may be set to a distance from the reference line RL in the second direction DR2. In an embodiment, a first horizontal line HL1 among the horizontal lines may be located at a first position spaced apart from the reference line RL by a first distance d1 in the second direction DR2, and a second horizontal line HL2 among the horizontal lines may be located at a second position spaced apart from the reference line RL by a second distance d2 in the second direction DR2. A maximum value (i.e., a position corresponding to a horizontal line farthest apart from the reference line RL) among the positions may fail to be greater than a length Lt in the second direction DR2 of the display device 1000.

Luminance values measured at positions corresponding to horizontal lines in the TSP-ON state by the luminance meter 3100 may be referred to as the first luminance measurement values Bd1, and luminance values measured at positions corresponding to horizontal lines in the TSP-OFF state by the luminance meter 3100 may be referred to as the second luminance measurement values Bd2.

According to an embodiment, the transmit electrodes TE1-TE6 (refer to FIG. 6) of the input sensor 200 (refer to FIG. 6) may be extended in the first direction DR1, and the receive electrodes RE1-RE4 (refer to FIG. 6) intersecting the transmit electrodes TE1-TE6 to be insulated from the transmit electrodes TE1-TE6 may be extended in the second direction DR2. In the TSP-ON state, the transmit electrodes TE1-TE6 may receive transmit signals TS (refer to FIG. 6) from a sensor controller 200C (refer to FIG. 6). Noise may occur in the test image displayed on the display device 1000, due to the transmit signals TS. Herein, the noise which occurs due to the transmit signals TS may be a stain on the horizontal line, which occurs in parallel to the first direction DR1. In the TSP-OFF state, the transmit electrodes TE1-TE6 may not receive the transmit signals TS (refer to FIG. 6) from the sensor controller 200C.

Referring again to FIG. 7, the converter 3200 may receive the first luminance measurement values Bd1 and the second luminance measurement values Bd2, which are measured by the luminance meter 3100, and may determine (e.g., calculate) luminance difference values between the first luminance measurement values Bd1 and the second luminance measurement values Bd2. The converter 3200 may apply a contrast sensitivity function to the calculated luminance difference values to convert the calculated luminance difference values into final conversion values Cvf. When an inspector recognizes luminance differences with the naked eye to determine whether noise occurs, accuracy may be degraded and a deviation may occur for each inspector. According to various embodiments, the final conversion values Cvf converted by means of the converter 3200 may have a value recognizable with the naked eye by the inspector.

The determiner 3300 may compare the final conversion values Cvf with a predetermined reference range to determine (e.g., calculate) a position where noise occurs in the test image, a magnitude of the noise, and the like. When at least one of the final conversion values Cvf is out of the reference range, the determiner 3300 may determine that a noise defect occurs in the display device 1000.

Figure 9A:
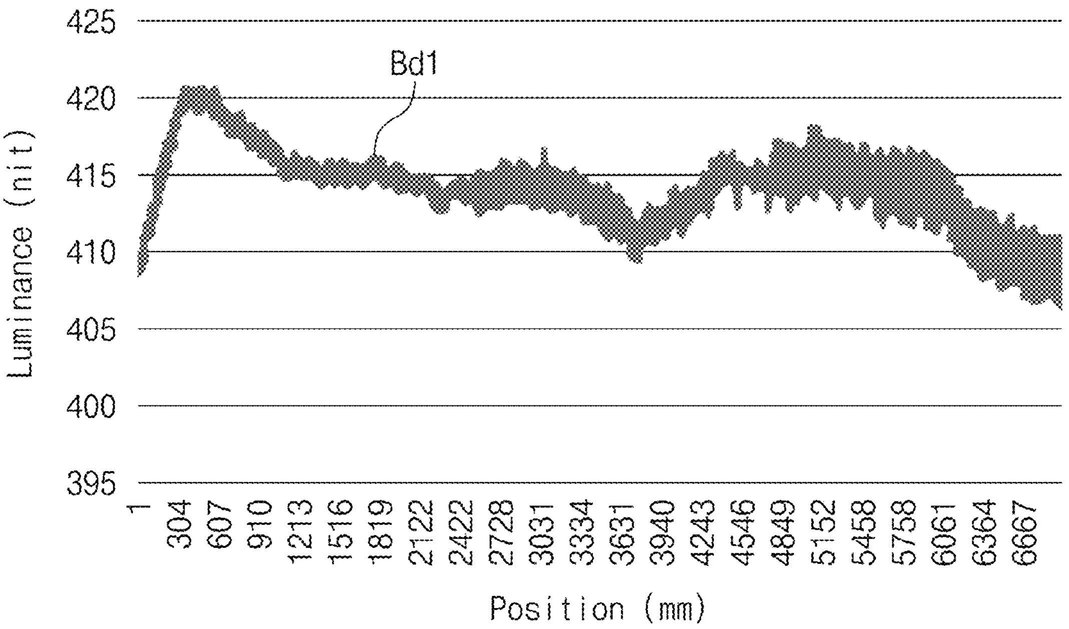
FIG. 9A is a graph illustrating first luminance measurement values for each position of a display device that are measured in a state where an input sensor is turned on according to an embodiment.
Figure 9B:
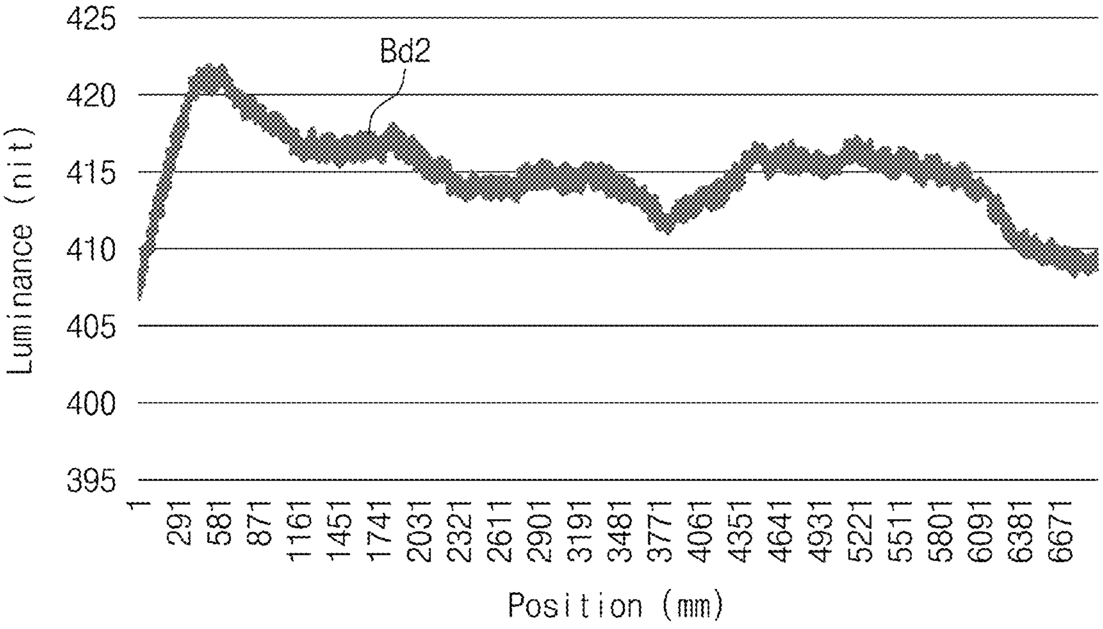
FIG. 9B is a graph illustrating second luminance measurement values for each position of a display device that are measured in a state where an input sensor is turned off according to an embodiment.
Figure 9C:
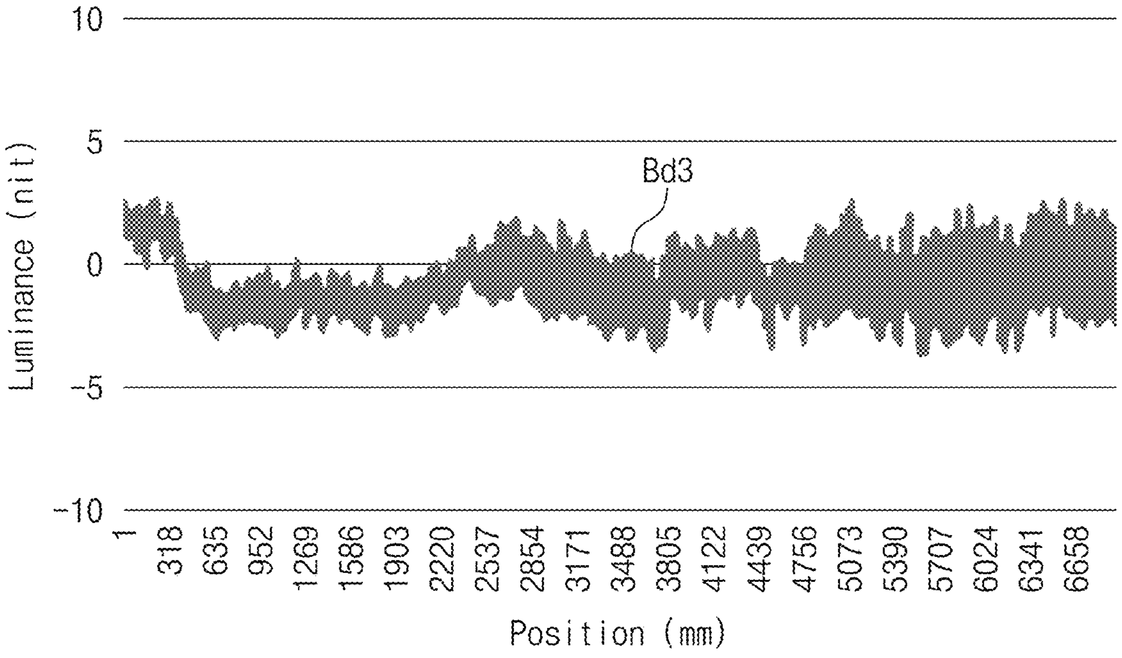
FIG. 9C is a graph illustrating luminance difference values for each position between first luminance measurement values shown in FIG. 9A and second luminance measurement values shown in FIG. 9B according to an embodiment.

FIG. 9A is a graph illustrating first luminance measurement values for each position of a display device, which are measured in a state where an input sensor is turned on, according to an embodiment. FIG. 9B is a graph illustrating second luminance measurement values for each position of a display device, which are measured in a state where an input sensor is turned off, according to an embodiment. FIG. 9C is a graph illustrating luminance difference values for each position between first luminance measurement values shown in FIG. 9A and second luminance measurement values shown in FIG. 9B according to an embodiment.

Referring to FIGS. 6, 8A, and 9A, in a TSP-ON state, the first luminance measurement values Bd1 for each position according to the result of measuring a luminance of a test image displayed on a display surface FS of a display device 100 in a luminance meter 3100 is shown. Here, the x-axis indicates the position (mm), and the y-axis indicates the luminance (nit). In the TSP-ON state, the transmit electrodes TE1-TE6 may receive the transmit signals TS from the sensor controller 200C. It may be seen that noise occurs in the test image displayed on the display device 1000 due to the transmit signals TS. For example, in an ideal situation where noise does not occur in the test image displayed on the display device 1000, the first measurement values Bd1 for each position may have a certain magnitude. However, according to the actually measured result, it is shown that the first luminance measurement values Bd1 have different values depending on positions due to noise.

The cause of a phenomenon where the first luminance measurement values Bd1 measured in the TSP-ON state appear non-uniform may not be only noise by the transmit signals TS. In other words, luminance non-uniformity may occur in the test image due to noise that is internally generated in the display panel 100. Thus, a noise component internally generated in the display panel 100 and a noise component by the input sensor 200 may be included in the first luminance measurement values Bd1 measured in the TSP-ON state.

Referring to FIGS. 6, 8A, and 9B, in a TSP-OFF state, the second luminance measurement values Bd2 for each position according to the result of measuring a luminance of the test image displayed on the display surface FS of the display device 100 in the luminance meter 3100 is shown. In the TSP-OFF state, the transmit electrodes TE1-TE6 may fail to receive the transmit signals TS from the sensor controller 200C. Thus, the second luminance measurement values Bd2 measured in the TSP-OFF state may include only a noise component internally generated in the display panel 100 and may fail to include a noise component by the input sensor 200.

As shown in FIG. 9C, to obtain only a noise component by the input sensor 200, luminance measurement values Bd3 may be derived by subtracting the second luminance measurement values Bd2 from the first luminance measurement values Bd1 or subtracting the first luminance measurement values Bd1 from the second luminance measurement values Bd2. The luminance difference values Bd3 may include only a noise component by the input sensor 200. Here, the luminance difference values Bd3 may fail to be a value of a level recognizable with the naked eye.

Figure 10:
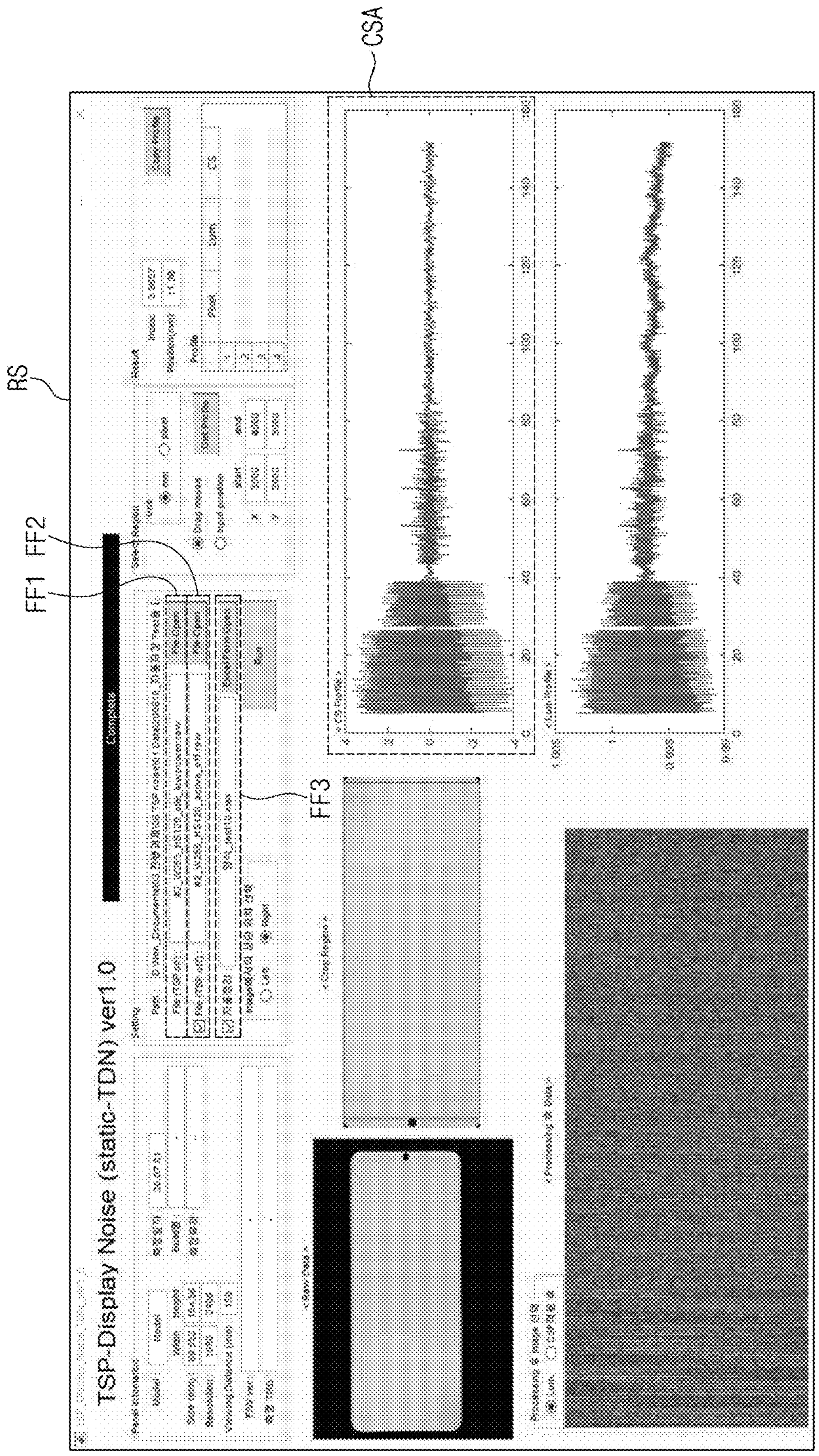
FIG. 10 is a conceptual diagram illustrating a screen obtained by executing a converter shown in FIG. 7 according to an embodiment.
Figure 11A:
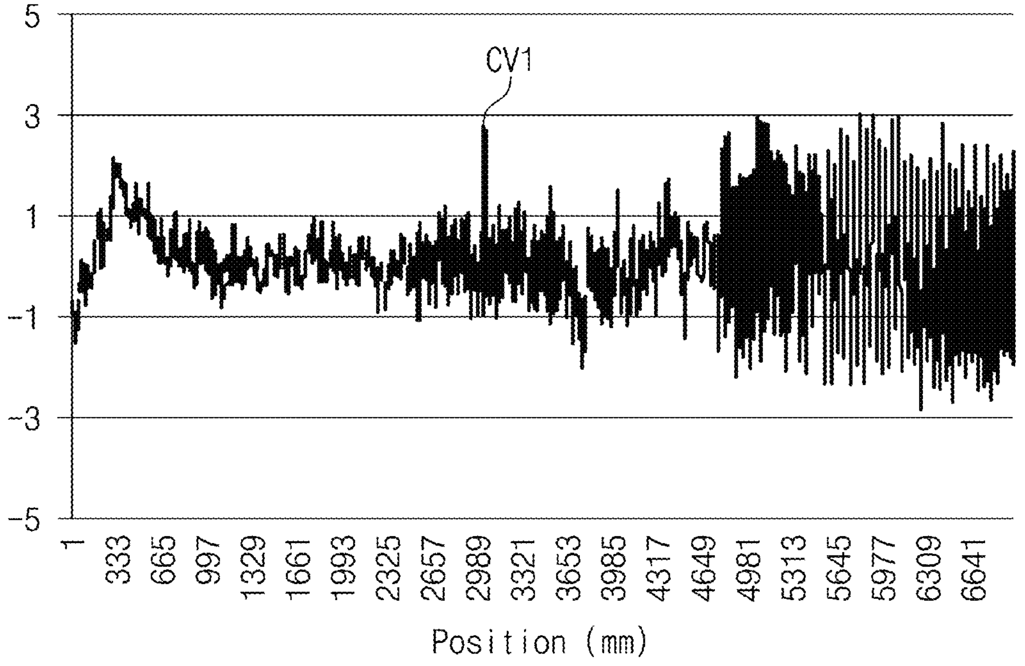
FIG. 11A is a graph illustrating first conversion values converted by applying a contrast sensitivity function to first luminance measurement values shown in FIG. 9A according to an embodiment.
Figure 11B:
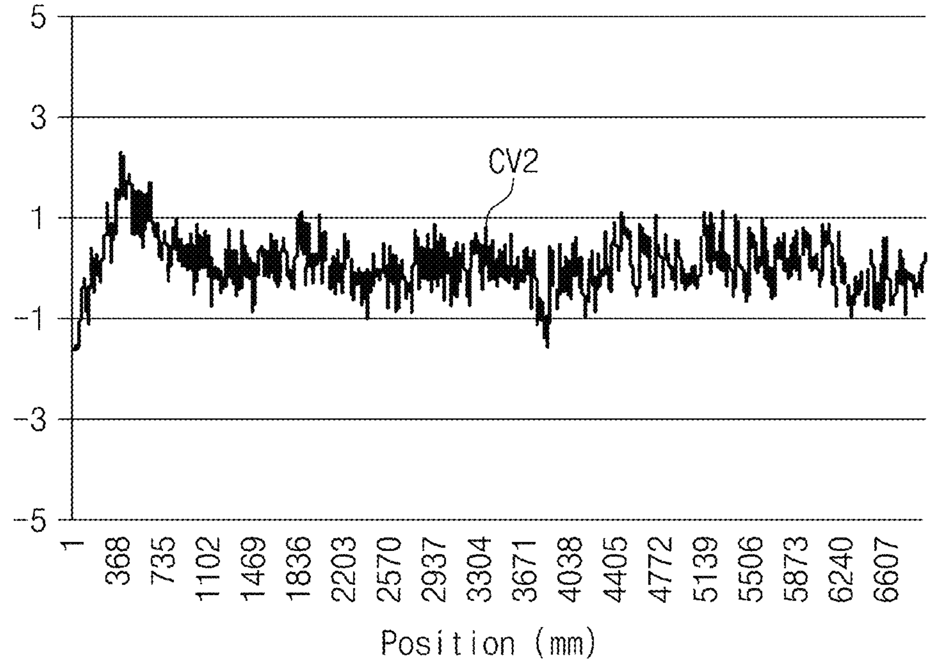
FIG. 11B is a graph illustrating second conversion values converted by applying a contrast sensitivity function to second luminance measurement values shown in FIG. 9B according to an embodiment.
Figure 11C:
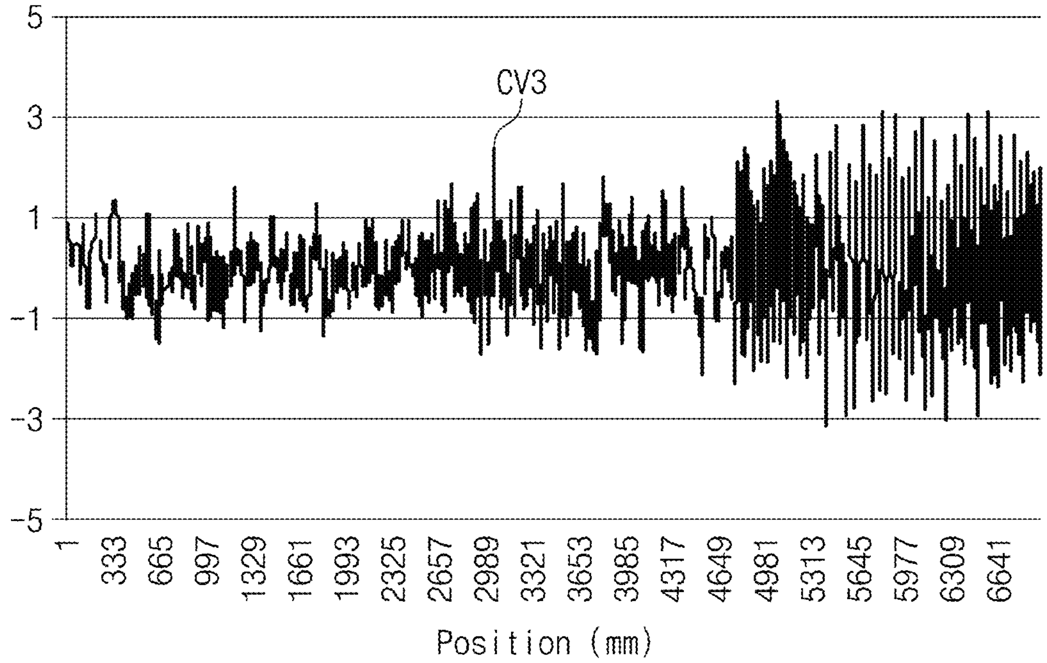
FIG. 11C is a graph illustrating third conversion values converted by applying a contrast sensitivity function to luminance difference values shown in FIG. 9C according to an embodiment.

FIG. 10 is a conceptual diagram illustrating a screen obtained by executing a converter shown in FIG. 7 according to an embodiment. FIG. 11A is a graph illustrating first conversion values converted by applying a contrast sensitivity function to first luminance measurement values shown in FIG. 9A according to an embodiment. FIG. 11B is a graph illustrating second conversion values converted by applying a contrast sensitivity function to second luminance measurement values shown in FIG. 9B according to an embodiment. FIG. 11C is a graph illustrating third conversion values converted by applying a contrast sensitivity function to luminance difference values shown in FIG. 9C according to an embodiment.

Referring to FIGS. 7 and 10, first luminance measurement values Bd1 and second luminance measurement values Bd2 may be input to a converter 3200. Each of the first and second luminance measurement values Bd1 and Bd2 measured from the luminance meter 3100 may be stored in the form of a file. Herein, a file in which the first luminance measurement values Bd1 are stored may be referred to as a first file, and a file in which the second luminance measurement values Bd2 are stored may be referred to as a second file. A first file input field FF1 and a second file input field FF2 may be provided on a running screen RS of the converter 3200. A "TSP on" may be displayed on the first file input filed FF1, and a "TSP off" may be displayed on the second file input field FF2. The first file may be input to the first file input field FF1, and the second file may be input to the second file input field FF2.

The converter 3200 may calculate luminance difference values based on the first luminance measurement values Bd1 stored in the first file and the second luminance measurement values Bd2 stored in the second file and may apply a contrast sensitivity function to the calculated luminance measurement values to convert the calculated luminance measurement values into the final conversion values Cvf. The final conversion values Cvf may be displayed on a first area CSA of the running screen RS in the form of a profile.

Furthermore, the converter 3200 may automatically arrange the measured final conversion values Cvf for each display device to generate the final conversion values Cvf in the form of an output file, such as Microsoft Excel file. The generated file may be uploaded to a final file field FF3 of the running screen RS. An inspector may open the uploaded file.

Referring to FIGS. 11A to 11C, the converter 3200 may apply a contrast sensitivity function to the first luminance measurement values Bd1 to calculate first conversion values Cv1 for each position and may apply the contrast sensitivity function to the second luminance measurement values Bd2 to calculate second conversion values Cv2 for each position. The converter 3200 may calculate third conversion values Cv3 for each position using the first conversion values Cv1 and the second conversion values Cv2. As an example, the converter 3200 may derive the third conversion values Cv3 by subtracting the second conversion values Cv2 from the first conversion values Cv1. Herein, the derived third conversion values Cv3 may be the same as the final conversion values Cvf.

Figure 12:
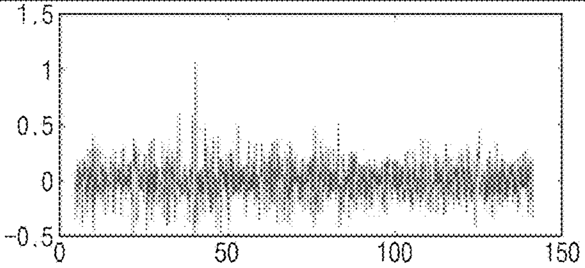
FIG. 12 is a result table illustrating results of measuring noise of sampled display devices among a plurality of display devices according to an embodiment.
Figure 12:
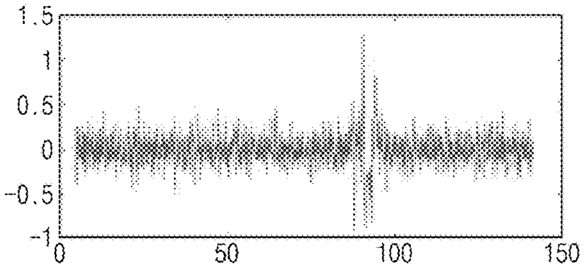
Figure 12:
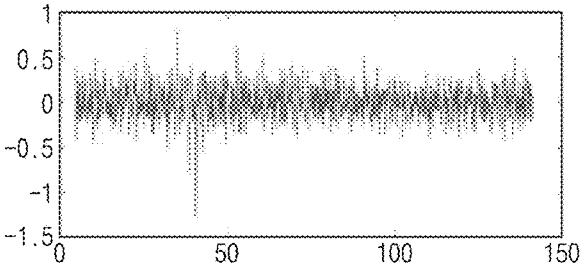
Figure 12:
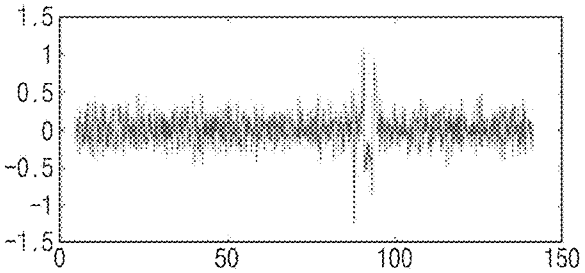

FIG. 12 is a result table illustrating the result of measuring noise of sampled display devices among a plurality of display devices according to an embodiment.

Referring to FIGS. 7 and 12, a sampling number may be assigned to each of the sampled display devices. The noise measurement device 3000 may display the result of measuring noise for respective display devices in the form of a table. A number capable of identifying a measurement patterned displayed as a test image by the respective display devices may be displayed on a result table RT. The respective display devices may display at least one of a plurality of measurement patterns as a test image.

In the result table RT, a maximum value among the final conversion values Cvf measured in the respective display devices may be displayed on an index field InF, and a corresponding position having the maximum value may be displayed on a position field PoF. For example, it is shown that a display device where a sampling number is "#1" has a final conversion value of 1.06218 at a position of 40.44 mm and that a display device where a sampling number is "#2" has a final conversion value of 1.28151 at a position of 90.46 mm. A profile file PrF displaying a profile of the final conversion values Cvf measured in the respective display devices may be included in the result table RT.

According to an embodiment, final conversion values for positions may be further displayed on the result table RT.

As such, the noise measurement device 3000 may convert luminance difference values into the final conversion values Cvf recognizable with the naked eye by an inspector by means of the converter 3200 and may compare the final conversion values Cvf with a predetermined reference range to accurately determine whether noise occurs in the test image. Furthermore, the noise measurement device 3000 may accurately detect a noise occurrence position, a noise magnitude, and the like based on the final conversion values Cvf quantified by applying the contrast sensitivity function. Thus, the noise measurement device 3000 may accurately inspect slight noise and may improve reliability of the determined result as compared with visual evaluation in which the determined result differs for each inspector.

FIGS. 13A to 13D are waveform diagrams illustrating a noise measurement result measured for each frequency according to some embodiments.

Referring to FIGS. 6, 7, and 13A to 13D, a noise measurement result measured according to a frequency of the transmit signals TS is shown. As an example, the transmit signals TS may be signals, each of which has a frequency of hundreds of KHz. A frequency of the transmit signals TS applied to the input sensor 200 of the display device 1000 (refer to FIG. 8A) may be varied to measure noise of the display device 1000 for each frequency. A noise measurement scheme of the display device 1000 may be the same as that described with reference to FIGS. 7 to 12. Only a frequency of transmit signals TS applied in the TSP-ON state may be varied to measure noise.

Figure 13A:
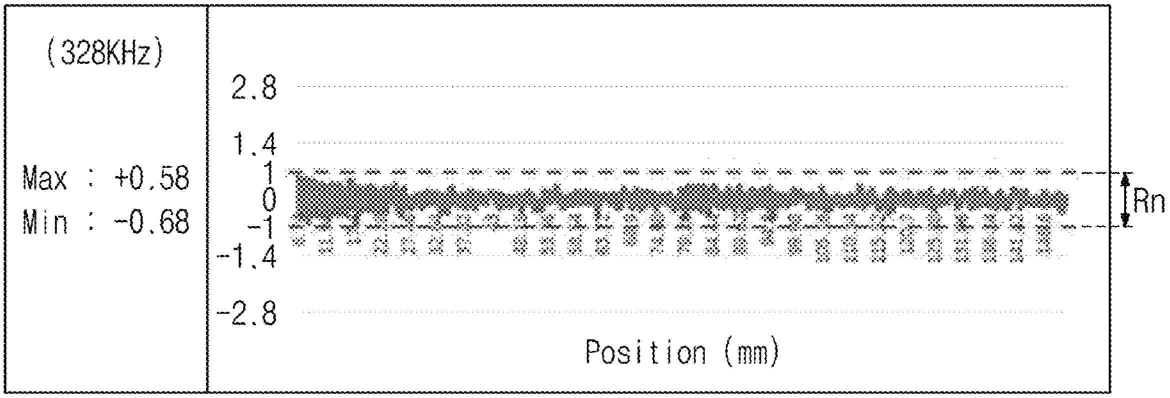
FIGS. 13A, 13B, 13C, and 13D are waveform diagrams illustrating a noise measurement result measured for various frequencies according to some embodiments.
Figure 13B:
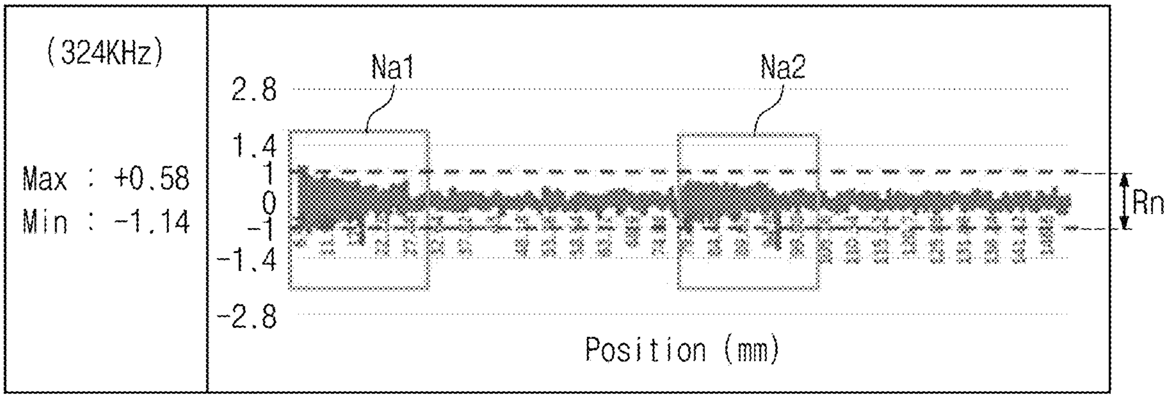
Figure 13C:
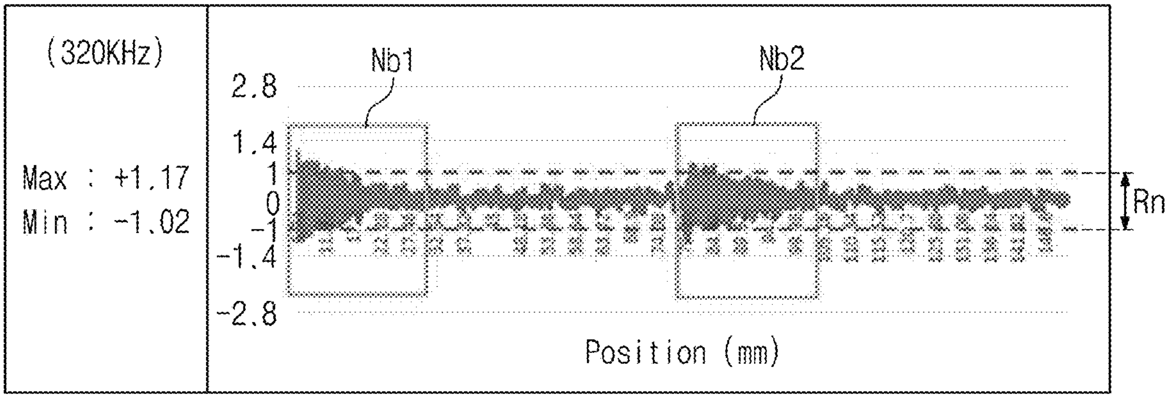
Figure 13D:
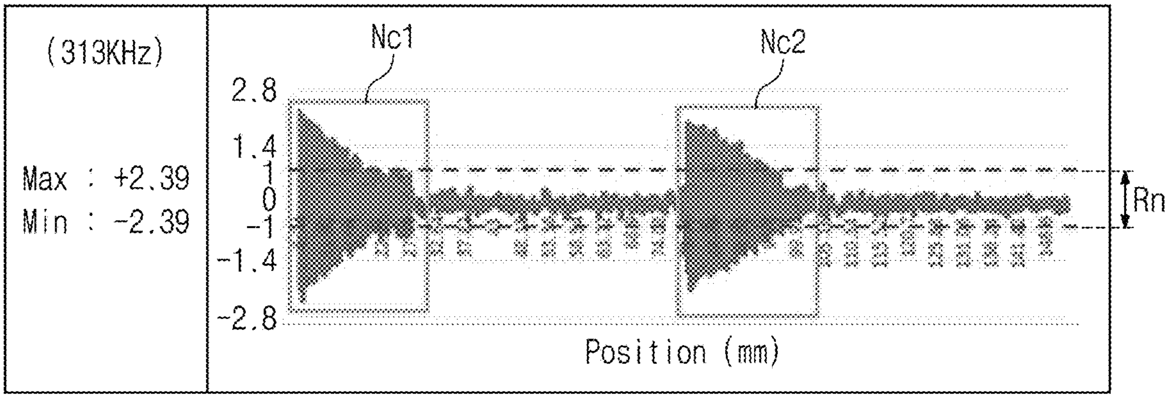

FIG. 13A illustrates final conversion values Cvf obtained by means of the noise measurement device 3000 when transmit signals TS having a frequency of 328 KHz is applied to the input sensor 200. FIG. 13B illustrates final conversion values Cvf obtained by means of the noise measurement device 3000 when transmit signals TS having a frequency of 324 KHz is applied to the input sensor 200. FIG. 13C illustrates final conversion values Cvf obtained by means of the noise measurement device 3000 when transmit signals TS having a frequency of 320 KHz is applied to the input sensor 200. FIG. 13D illustrates final conversion values Cvf obtained by means of the noise measurement device 3000 when the transmit signals TS having a frequency of 313 KHz is applied to the input sensor 200.

As an example, the determiner 3300 may set a reference range Rn to 1 to −1. When all the final conversion values Cvf are located within the reference range Rn, the determiner 3300 may determine that a noise defect does not occur in the display device 1000. As shown in FIG. 13A, when the transmit signals TS have the frequency of 328 KHz, a maximum value among the final conversion values Cvf is shown as +0.58 and a minimum value among the final conversion values Cvf is shown as −0.68. Thus, because all the final conversion values Cvf shown in FIG. 13A are present within the reference range Rn, it may be determined that a noise defect does not occur in the display device 1000. However, as shown in FIGS. 13B to 13D, when the transmit signals TS have a frequency of 324 KHz, 320 KHz, or 313 KHz, it is shown that noise areas Na1, Na2, Nb1, Nb2, Nc1, and Nc2 where the final conversion values Cvf are not present within the reference range Rn are detected.

Thus, the determiner 3300 may fail to determine a frequency of 324 KHz, 320 KHz, or 313 KHz, in which noise is detected, as an optimal frequency and may determine only the frequency of 328 KHz, in which noise is not detected, as the optimal frequency.

As an example, when the reference range Rn is set to 1.2 to −1.2, the frequency of 320 KHz where a maximum value among the final conversion values Cvf is shown as +1.17 and the frequency of 324 KHz where a minimum value among the final conversion values Cvf is shown as −1.14 may fail to be determined as a defect. In this case, the determiner 3300 may fail to determine only a frequency of 313 KHz as an optimal frequency and may determine frequencies of 328 KHz, 324 KHz, and 320 KHz as optimal frequencies.

As such, by detecting a bad defect for each frequency, the determined result may be used to tune transmit signals to have an optimal frequency in which noise does not occur.

Figure 14A:
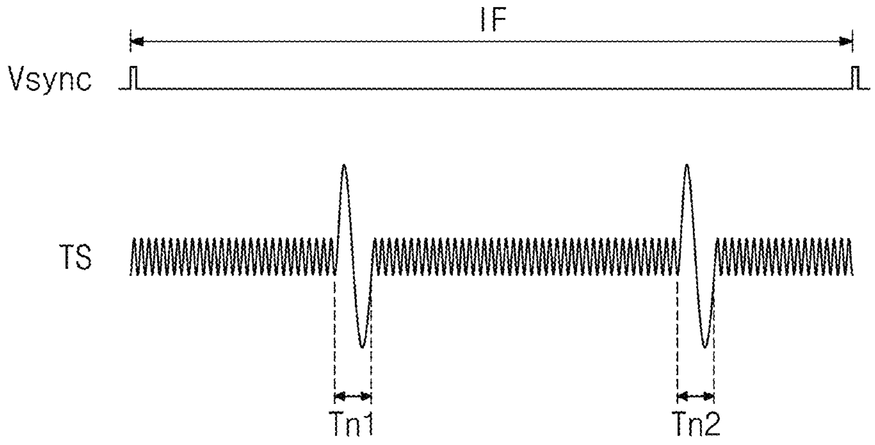
FIG. 14A is a waveform diagram illustrating a vertical synchronization signal and transmit signals according to an embodiment.
Figure 14B:
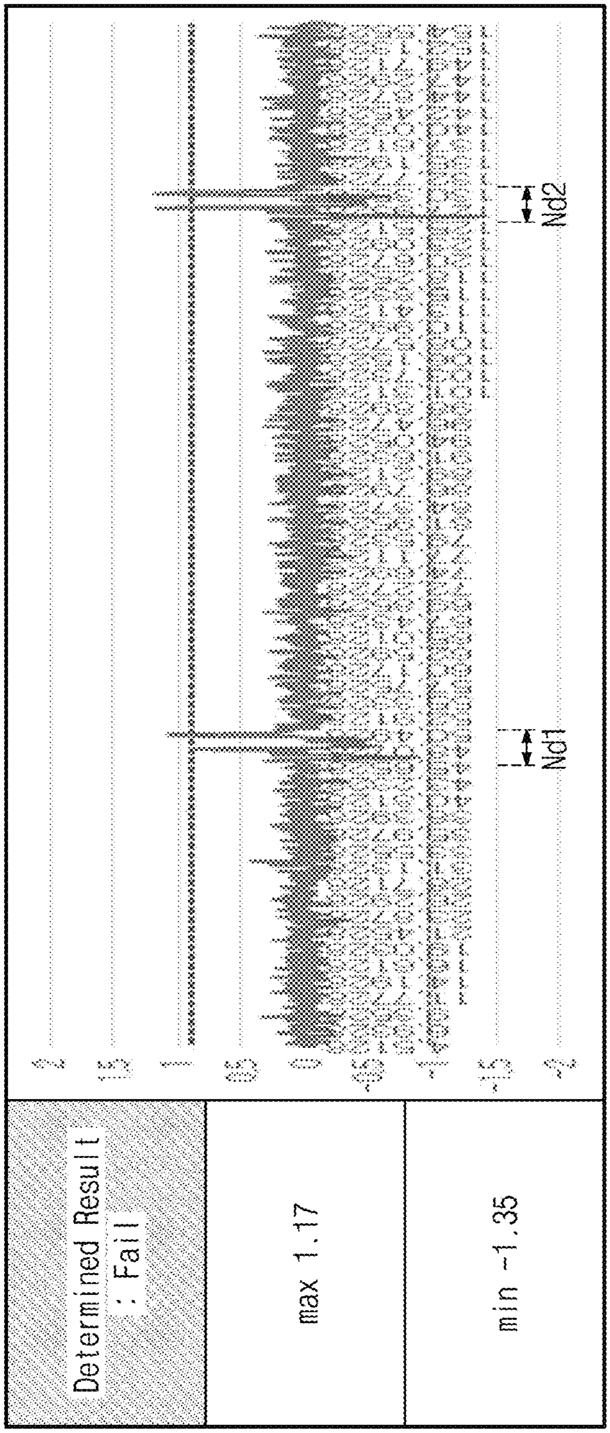
FIG. 14B is a result table illustrating a noise measurement result of transmit signals shown in FIG. 14A according to an embodiment.

FIG. 14A is a waveform diagram illustrating a vertical synchronization signal and transmit signals according to an embodiment. FIG. 14B is a result table illustrating a noise measurement result by transmit signals shown in FIG. 14A according to an embodiment.

Referring to FIGS. 5, 6, 7, 14A, and 14B, a period of a vertical synchronization signal Vsync may be defined as one frame 1F. The display panel 100 may display an image in units of one frame 1F. Scan signals may be sequentially provided to the scan lines SL1-SLn in one frame 1F. As an example, the transmit signals TS may include noise which occurs in two intervals in the one frame 1F. First noise may be noise which occurs in a first interval tp1 where a time of about 5.6 μs elapses from a start time point of the one frame 1F, and second noise may be noise which occurs in a second interval tp2 at a time interval of 7.3 μs from the first noise.

When the transmit signals TS including noise are input to the input sensor 200, noise may be displayed on a test image of the display device 1000. As a result of measuring the test image of the display device 1000 using the noise measurement device 3000, it is measured that noise occurs in first and second areas Nd1 and Nd2. Herein, the first area Nd1 may be defined as an area where scan lines receiving a scan signal during a first interval Tn1 are arranged, and the second area Nd2 may be defined as an area where scan lines receiving a scan signal during a second interval Tn2 are arranged.

The largest value among the final conversion values Cvf obtained by measuring the test image of the display device 1000 using the noise measurement device 3000 may be 1.17, and the smallest value among the final conversion values Cvf may be −1.35. Because final conversion values in the first and second areas Nd1 and Nd2 among the final conversion values Cvf are shown as being greater than a reference range (e.g., 1 to −1), the noise measurement device 3000 may determine the display device 1000 as a noise defect.

Figure 15:
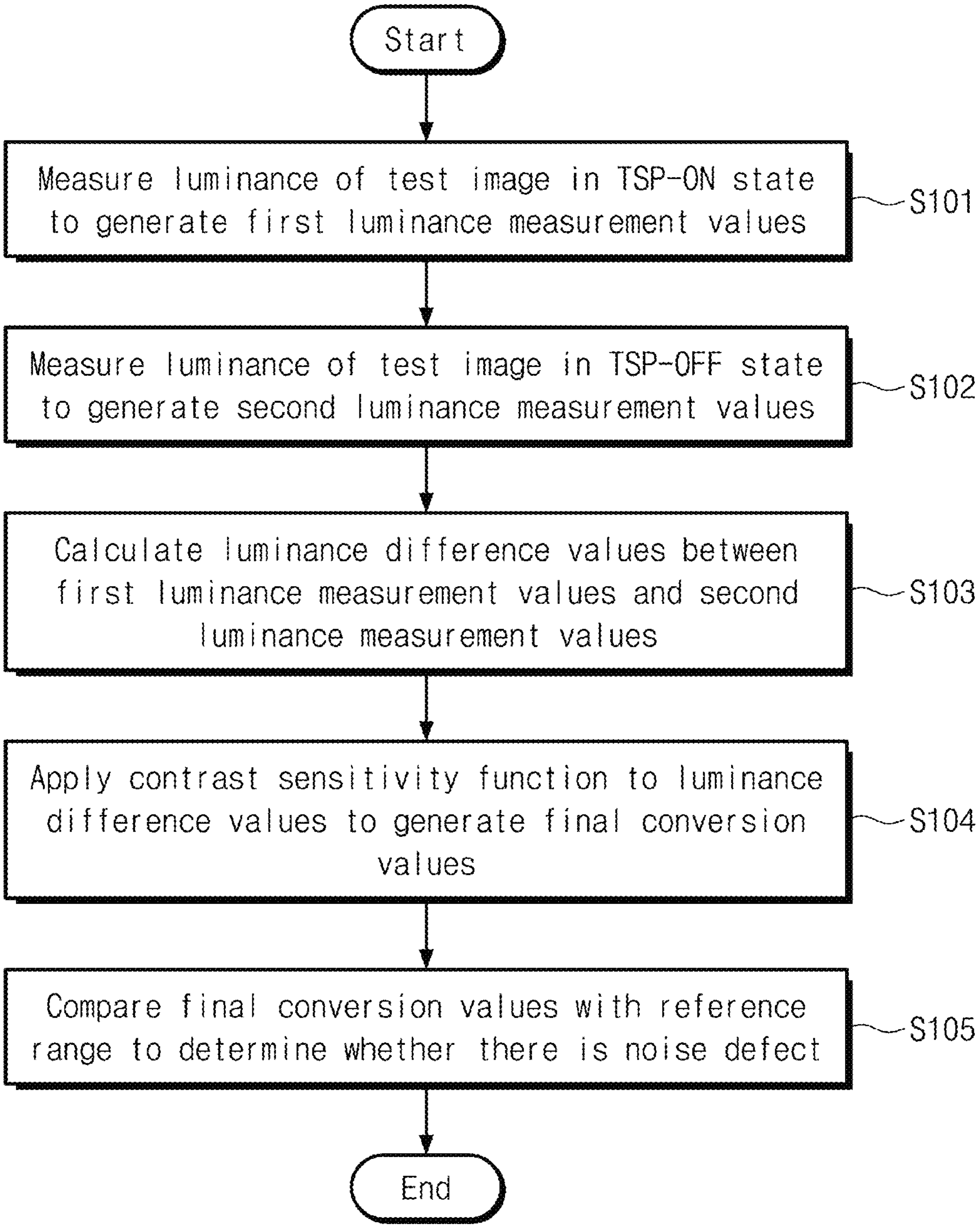
FIG. 15 is a flowchart illustrating a noise measurement method according to an embodiment.

FIG. 15 is a flowchart illustrating a noise measurement method according to an embodiment.

Referring to FIGS. 7 to 15, according to the noise measurement method of the present disclosure, in S101, the noise measurement device 3000 may measure a luminance of a test image displayed on the display device 1000 in a TSP-ON state to generate the first luminance measurement values Bd1 for each position.

Thereafter, in S102, the noise measurement device 3000 may measure a luminance of the test image displayed on the display device 1000 in a TSP-OFF state to generate the second luminance measurement values Bd2 for each position. The noise measurement device 3000 may use a luminance meter 3100 to generate the first and second luminance measurement values Bd1 and Bd2. The luminance meter 3100 may be a surface meter.

Next, in S103, the noise measurement device 3000 may calculate luminance difference values between the first luminance measurement values Bd1 and the second luminance measurement values Bd2. The luminance measurement values may be values generated by subtracting the second luminance measurement values Bd2 from the first luminance measurement values Bd1 or subtracting the first luminance measurement values Bd1 from the second luminance measurement values Bd2.

In S104, the noise measurement device 3000 may apply a contrast sensitivity function to the luminance difference values to generate the final conversion values Cvf. The final conversion values Cvf may be values recognizable with the naked eye by an inspector. In S105, the noise measurement device 3000 may compare the final conversion values Cvf with a predetermined reference range to determine whether there is a noise defect in the display device 1000. The noise measurement device 3000 may display whether there is a noise defect in the display device 1000 in the form of "Pass" or "Fail". Furthermore, the noise measurement device 3000 may further display a position where noise occurs in the test image, a magnitude of the noise, and the like.

According to an embodiment, a noise measurement device may convert luminance difference values into final conversion values recognizable with the naked eye by an inspector and may compare the final conversion values with a predetermined range to accurately determine whether noise occurs in a test image. Furthermore, the noise measurement device may accurately inspect slight noise based on final conversion values quantified by applying a contrast sensitivity function and may improve reliability of the determined result as compared with visual evaluation where the determined result differs for each inspector.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A noise measurement device for measuring noise of a test image displayed on a display device comprising a display panel and an input sensor disposed on the display panel, the input sensor being configured to sense an external input and including a transmit electrode and a receive electrode, the noise measurement device comprising:

a luminance meter separate from the display device configured to:

measure a luminance value of the test image by measuring virtual horizontal lines lines displayed on the display device in a turned-on state in which the transmit electrode of the input sensor receives transmit signals to generate first luminance measurement values including a noise component generated by the input sensor; and measure a luminance value of the test image by measuring the virtual horizontal lines displayed on the display device in a turned-off state in which the transmit electrode of the input sensor does not receive the transmit signals to generate second luminance measurement values without the noise component generated by the input sensor;

a converter separate from the display device configured to apply a contrast sensitivity function to luminance difference values between the first luminance measurement values and the second luminance measurement values to generate final conversion values; and a determiner separate from the display device configured to compare the final conversion values with a predetermined reference range to determine whether a noise defect generated by the input sensor exists in the test image.

2. The noise measurement device of claim 1, wherein the determiner is configured to determine the test image as being defective in response to at least one of the final conversion values being greater than the predetermined reference range.

3. The noise measurement device of claim 1, wherein the final conversion values are values into which the luminance difference values are converted in a level recognizable with naked eye by an inspector.

4. The noise measurement device of claim 1, wherein:

the display device comprises a display surface configured to display the test image, the display surface being parallel to a plane defined by a first direction and a second direction intersecting the first direction; and the luminance meter is configured to generate the first and second luminance measurement values for predetermined positions on the display surface.

5. The noise measurement device of claim 4, wherein the transmit electrode comprises a plurality of transmit electrodes extending in the first direction, the transmit electrodes being configured to receive the transmit signals; and the receive electrode comprises a plurality of receive electrodes intersecting the transmit electrodes and insulated from the transmit electrodes.

6. The noise measurement device of claim 5, wherein:

a reference line is disposed on one side of the display surface, the one side being parallel to the first direction; and the predetermined positions are set to a distance from the reference line in the second direction.

7. The noise measurement device of claim 5, wherein the luminance meter is configured to generate the first luminance measurement values and the second luminance measurement values for each frequency of the transmit signals.

8. The noise measurement device of claim 7, wherein the determiner is configured to determine, as an optimal frequency, a frequency measured at which all the final conversion values are present within the predetermined reference range among frequencies of the transmit signals.

9. The noise measurement device of claim 1, wherein whether the noise defect exists in the test image is displayed via a user interface.

10. The noise measurement device of claim 1, wherein a position where noise occurs in the test image and a magnitude of the noise are displayed via a user interface.

11. The noise measurement device of claim 1, wherein the display panel comprises:

a light emitting element layer comprising a light emitting element; and an encapsulation layer disposed on the light emitting element layer.

12. The noise measurement device of claim 11, wherein the input sensor is disposed directly on the encapsulation layer.

13. A noise measurement method for measuring noise of a test image displayed on a display device comprising a display panel and an input sensor disposed on the display panel, the input sensor being configured to sense an external input and including a transmit electrode and a receive electrode, the noise measurement method comprising:

measuring a luminance value of the test image by measuring virtual horizontal lines displayed on the display device in a turned-on state in which the transmit electrode of the input sensor receives transmit signals to generate first luminance measurement values including a noise component generated by the input sensor;

measuring a luminance value of the test image by measuring the virtual horizontal lines displayed on the display device in a turned-off state in which the transmit electrode of the input sensor does not receive the transmit signals to generate second luminance measurement values without the noise component generated by the input sensor;

determining luminance difference values between the first luminance measurement values and the second luminance measurement values;

applying a contrast sensitivity function to the luminance difference values to generate final conversion values; and comparing the final conversion values with a predetermined reference range to determine whether a noise defect generated by the input sensor exists in the test image.

14. The noise measurement method of claim 13, wherein comparing the final conversion values with the predetermined reference range comprises:

determining that the noise defect does not occur in the test image in response to all the final conversion values being within the predetermined reference range; or determining that the noise defect occurs in the test image in response to at least one of the final conversion values being out of the predetermined reference range.

15. The noise measurement method of claim 13, wherein the final conversion values are values into which the luminance difference values are converted into a level recognizable with the naked eye.

16. The noise measurement method of claim 13, wherein generating the first luminance measurement values comprises:

generating the first luminance measurement values for each frequency of the transmit signals applied to the input sensor.

17. The noise measurement method of claim 16, wherein comparing the final conversion values with the predetermined reference range comprises:

determining, as an optimal frequency, a frequency measured at which all the final conversion values are present within the predetermined reference range among frequencies of the transmit signals.

* * * * *